July 16, 1935.   W. H. FOSTER   2,008,010
TURRET LATHE
Filed April 4, 1929   12 Sheets-Sheet 1

Inventor
William H. Foster.
By Williamson, Huxley, Byron & Knight
Attys.

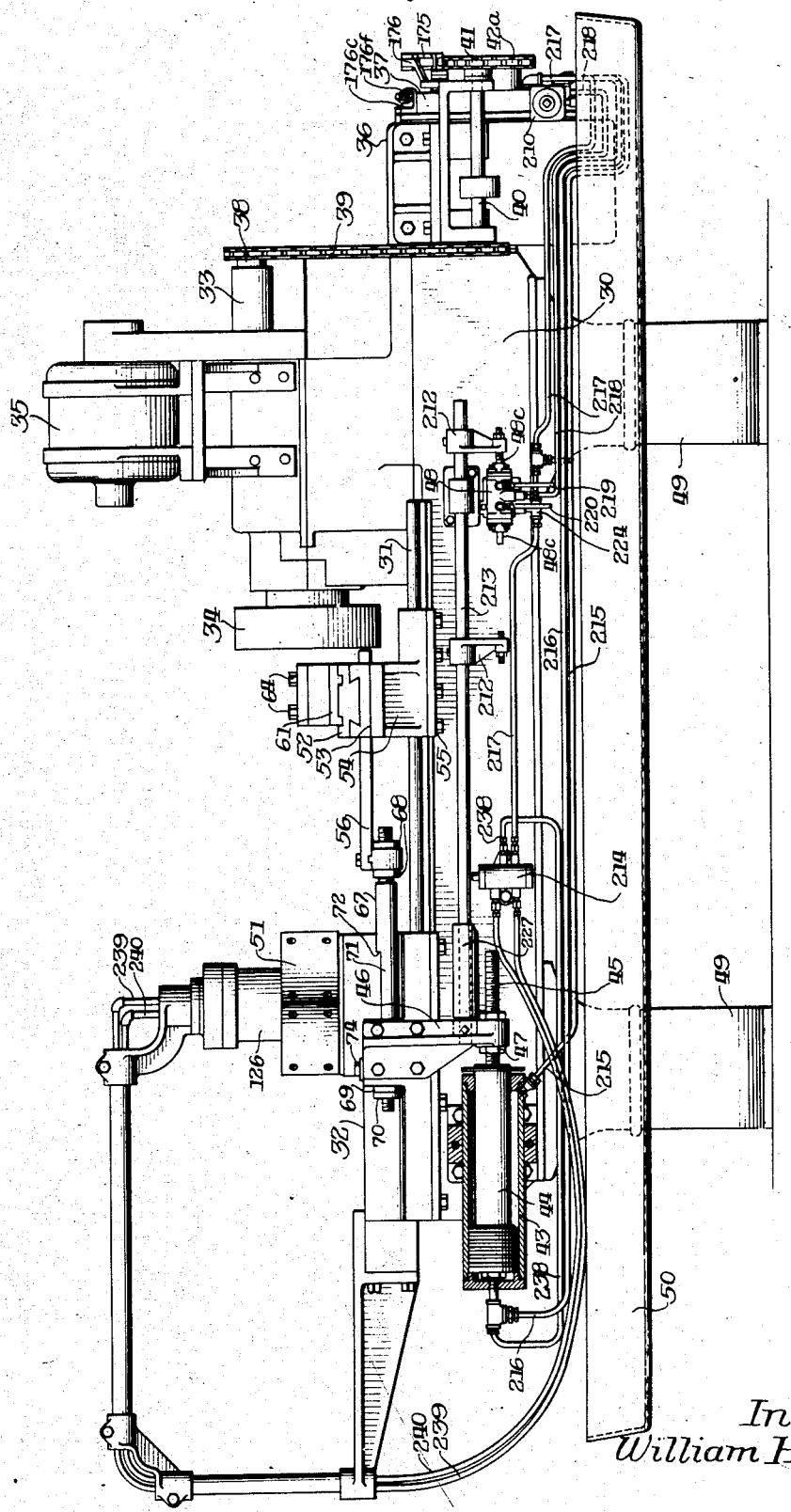

July 16, 1935.　　W. H. FOSTER　　2,008,010
TURRET LATHE
Filed April 4, 1929　　12 Sheets-Sheet 3
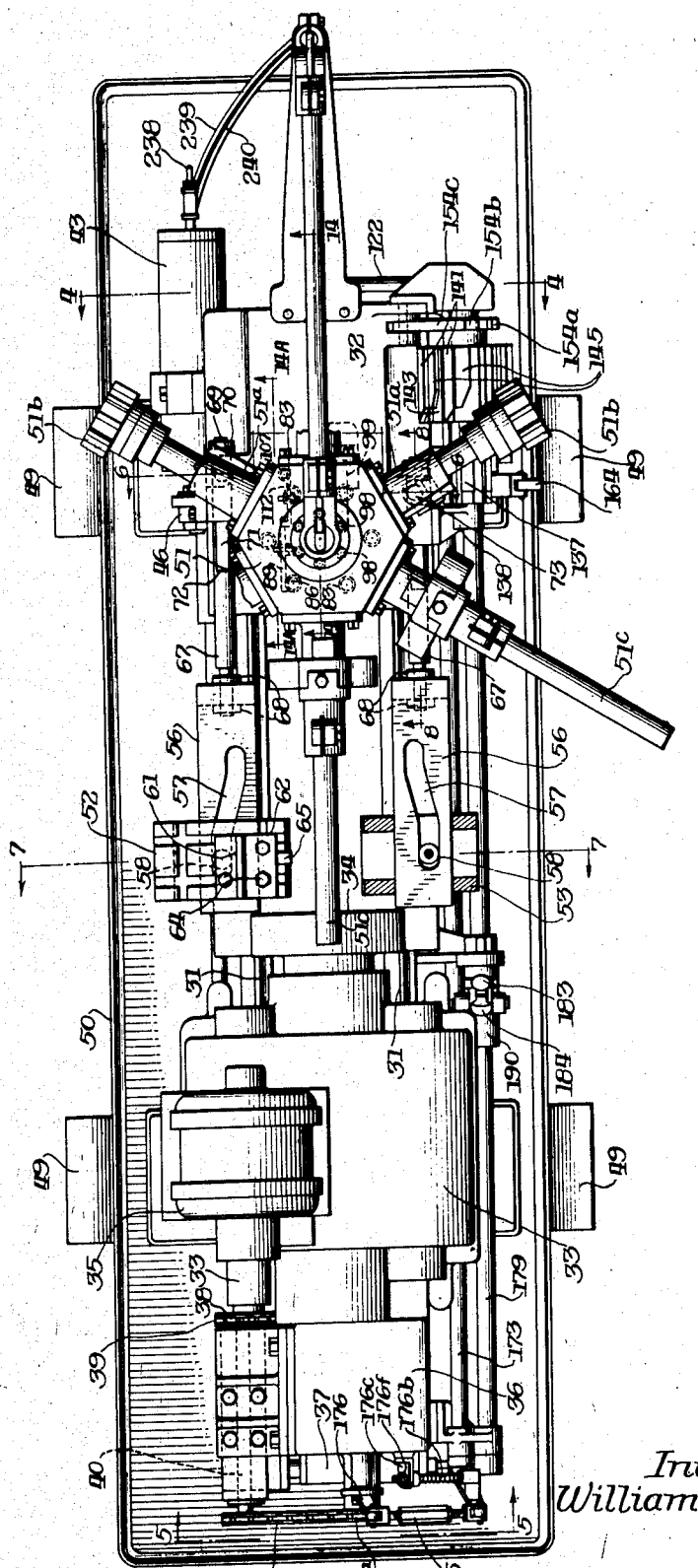
Inventor:
William H. Foster

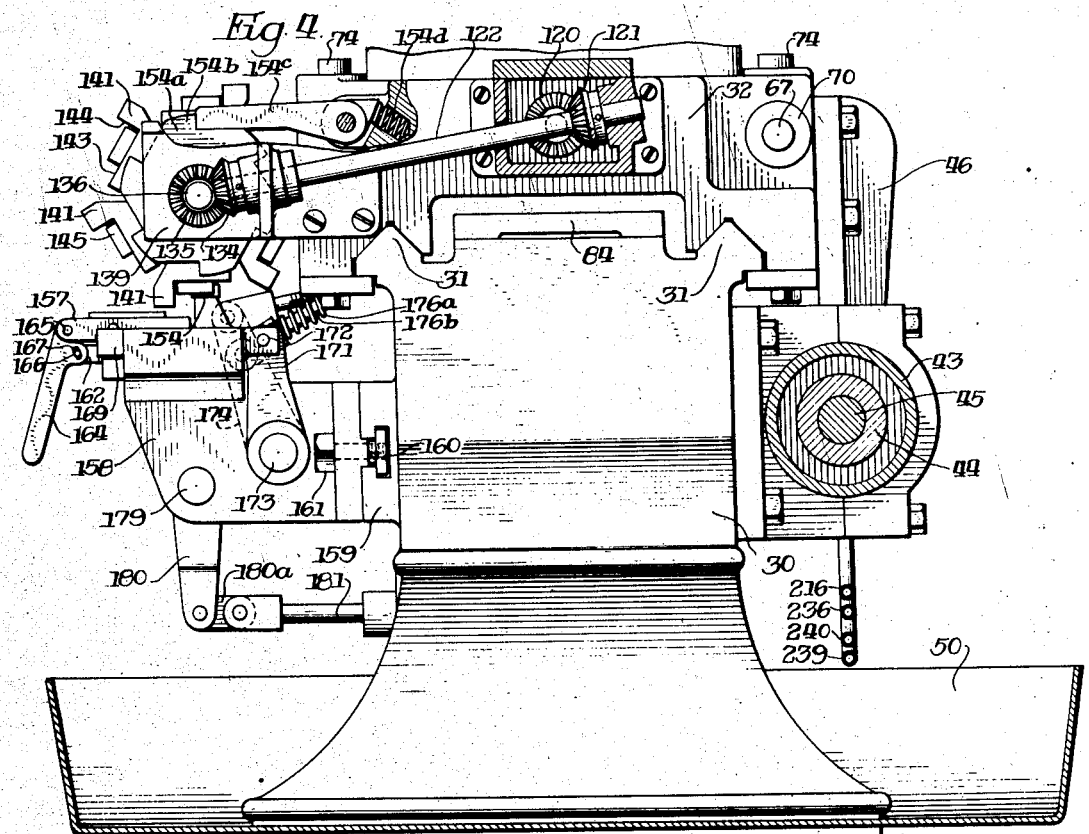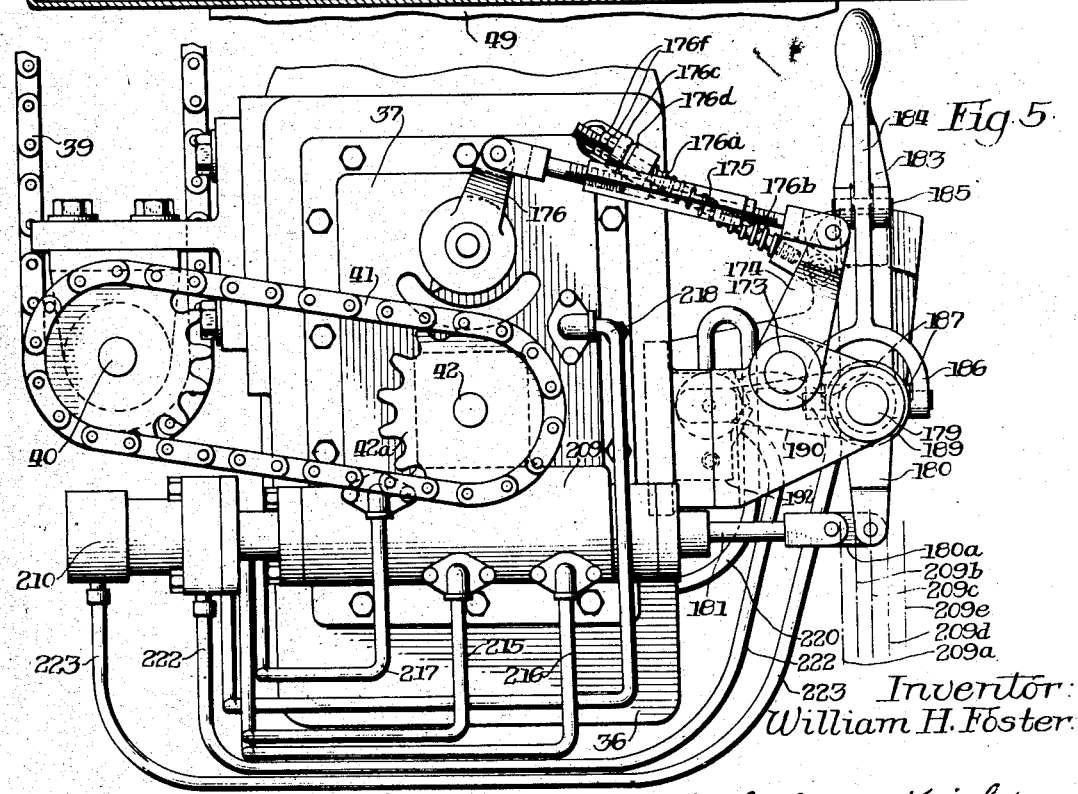

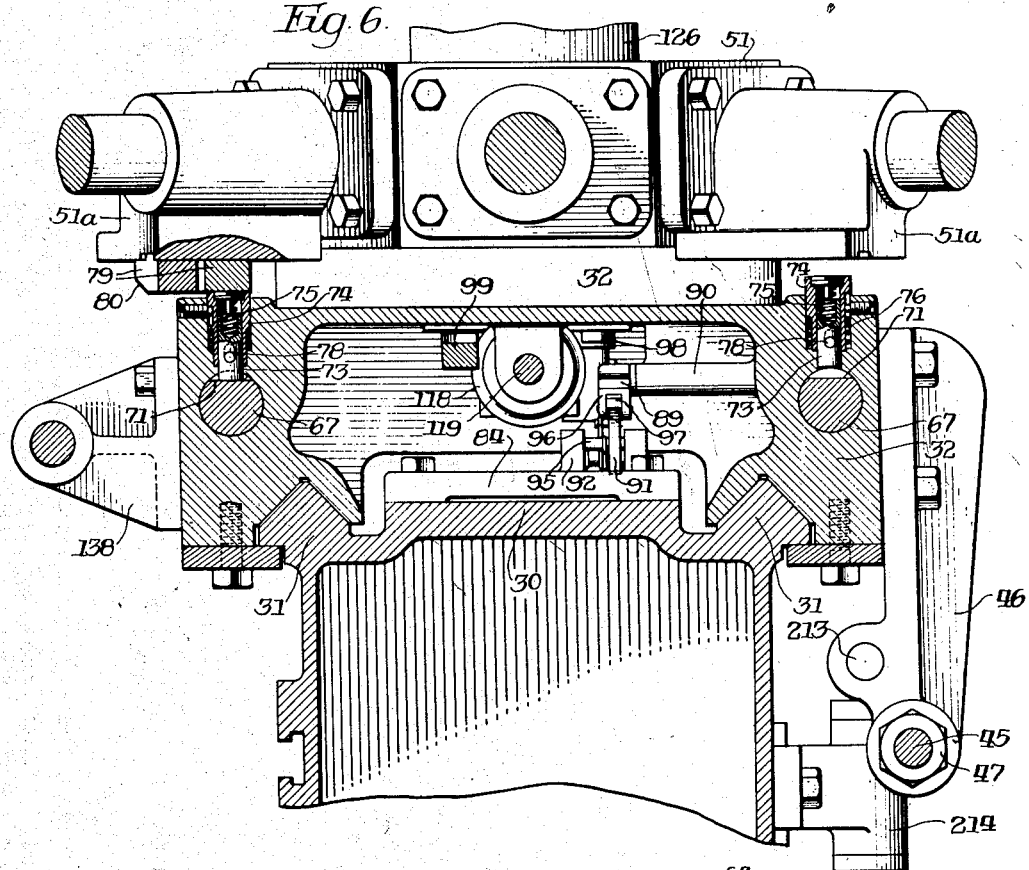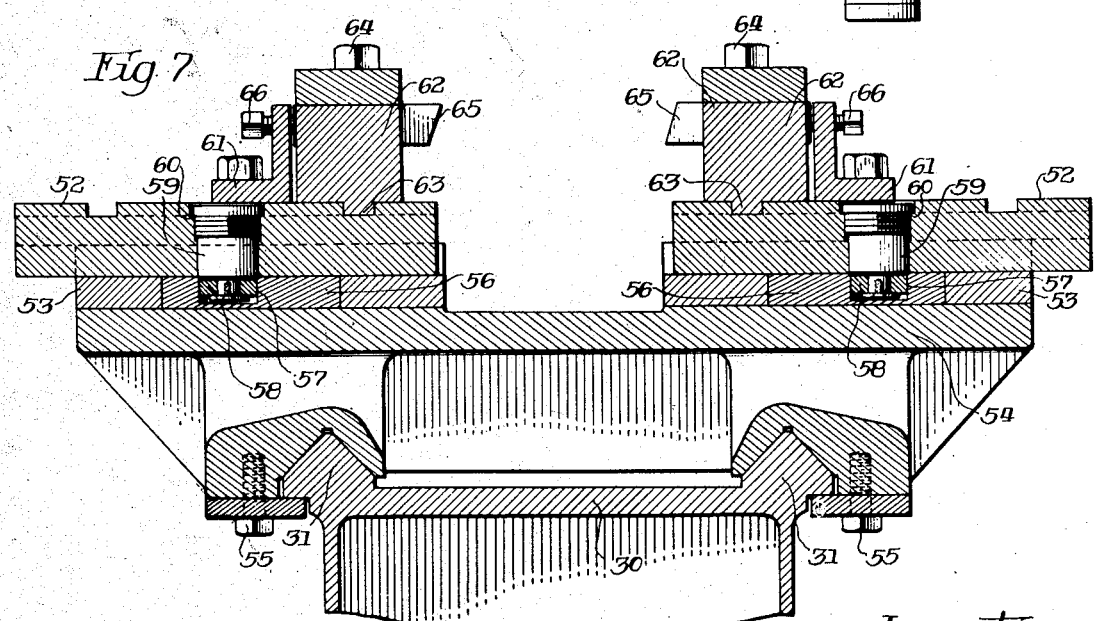

July 16, 1935.  W. H. FOSTER  2,008,010
TURRET LATHE
Filed April 4, 1929   12 Sheets-Sheet 6
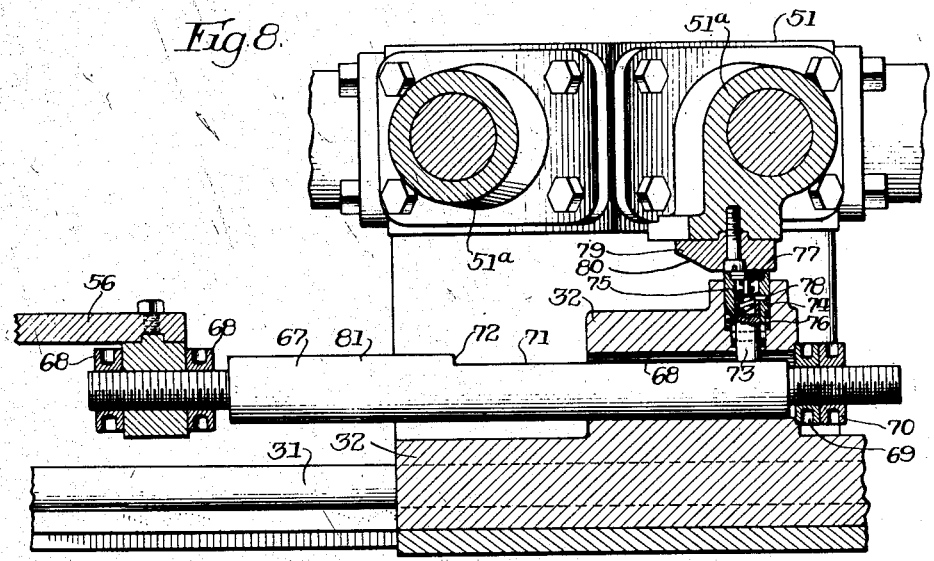
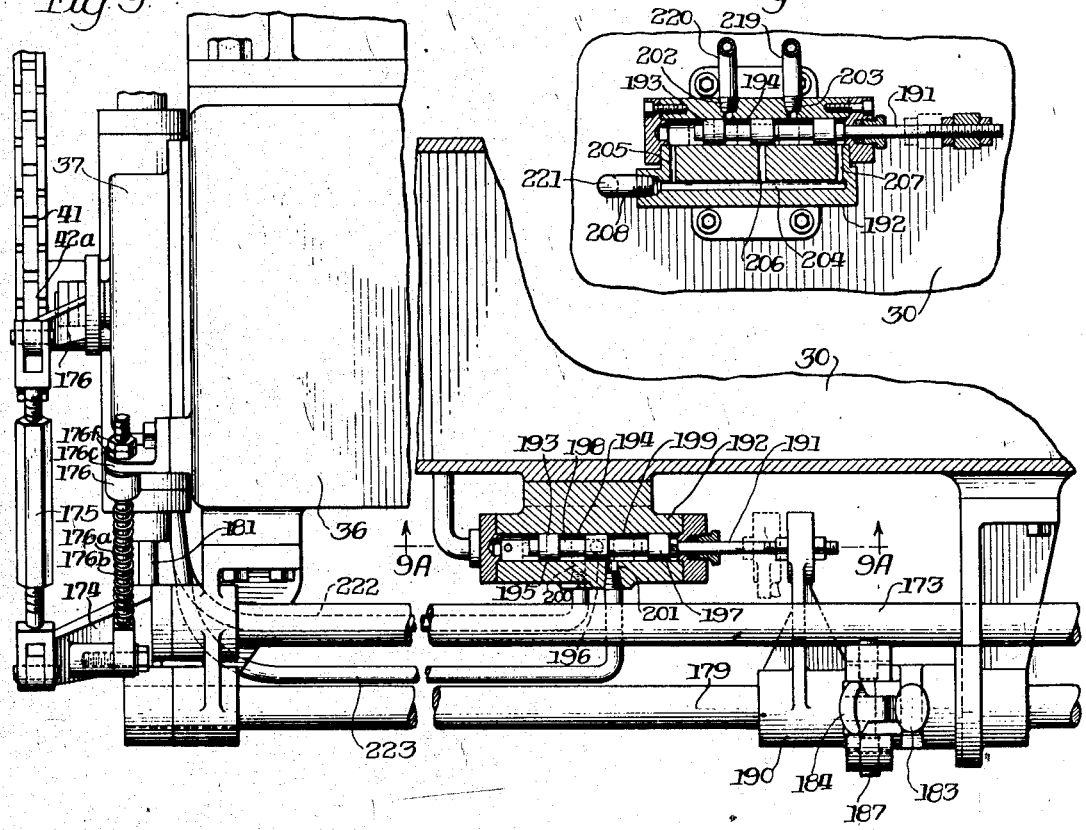
Inventor:
William H. Foster.

July 16, 1935.  W. H. FOSTER  2,008,010
TURRET LATHE
Filed April 4, 1929  12 Sheets-Sheet 7
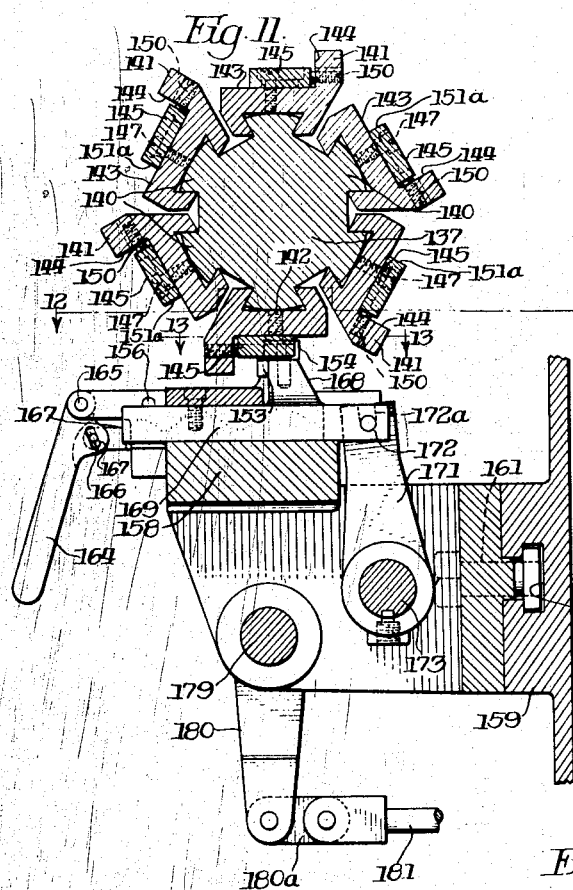
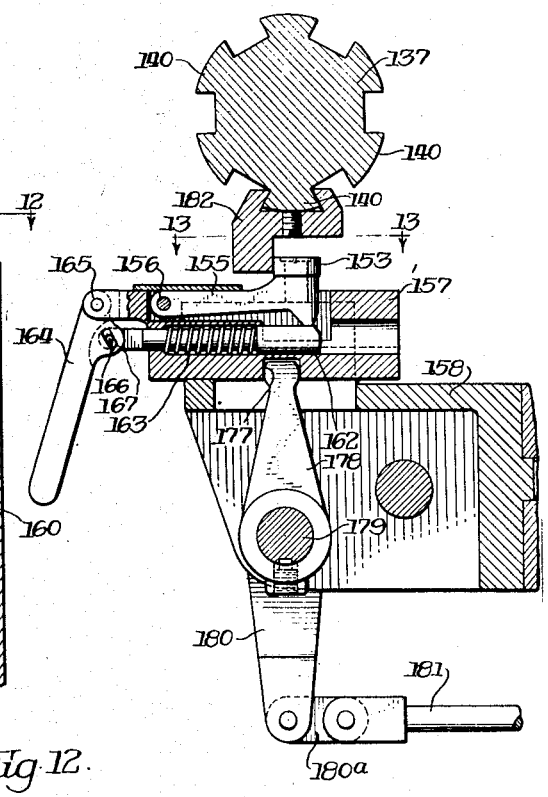
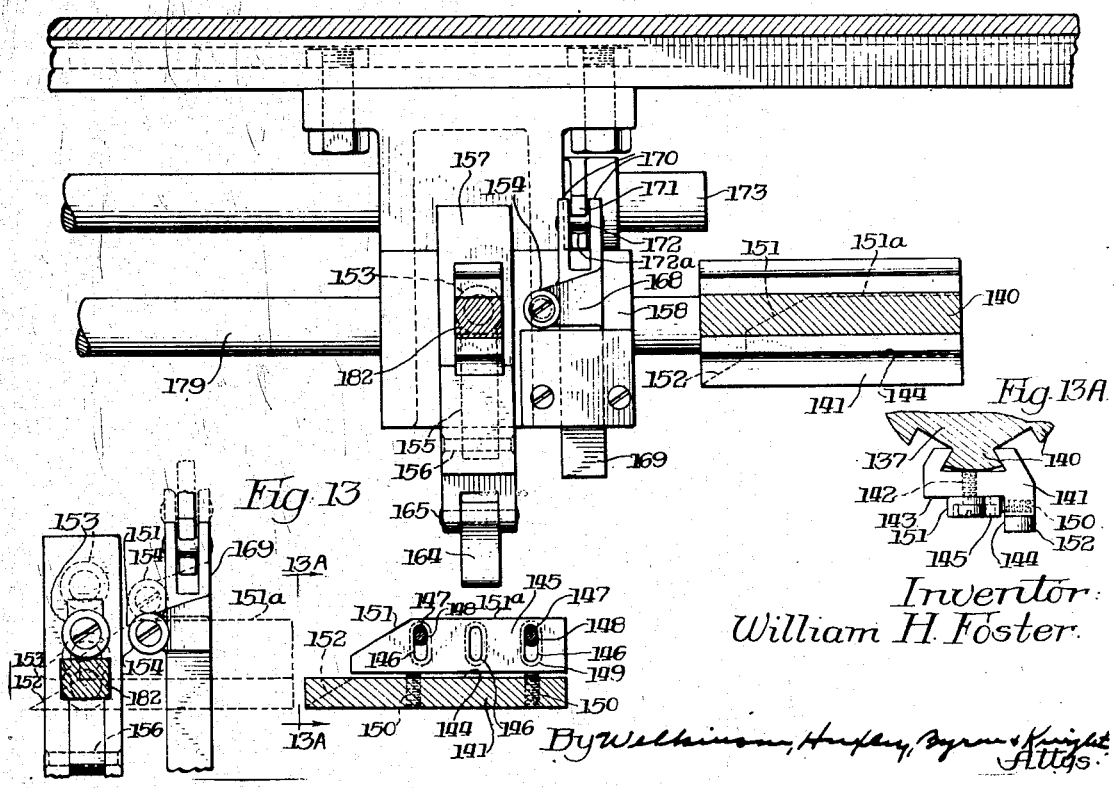
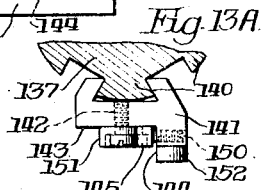
Inventor:
William H. Foster.
By Wilkinson, Huxley, Byron & Knight
Attys.

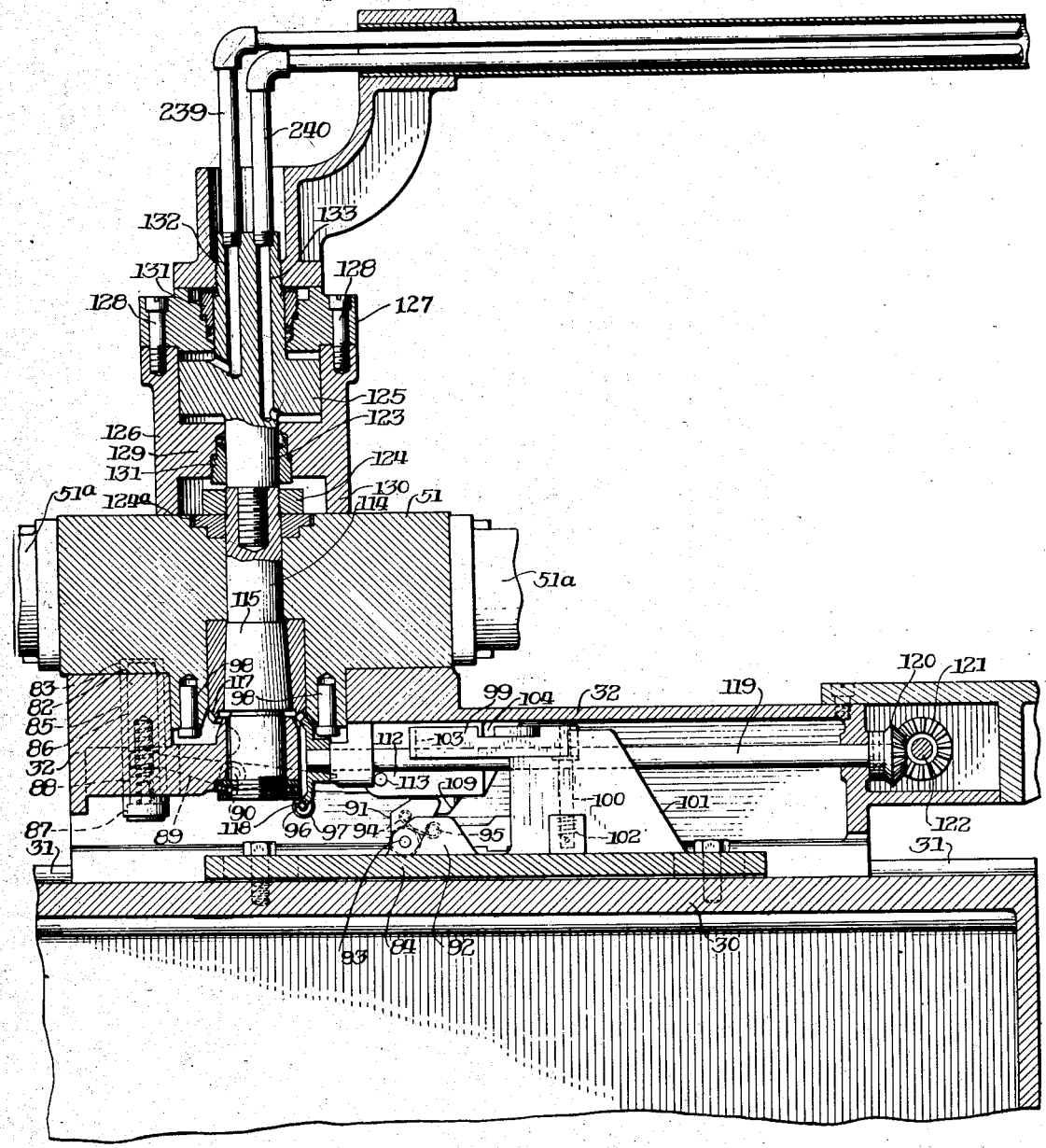

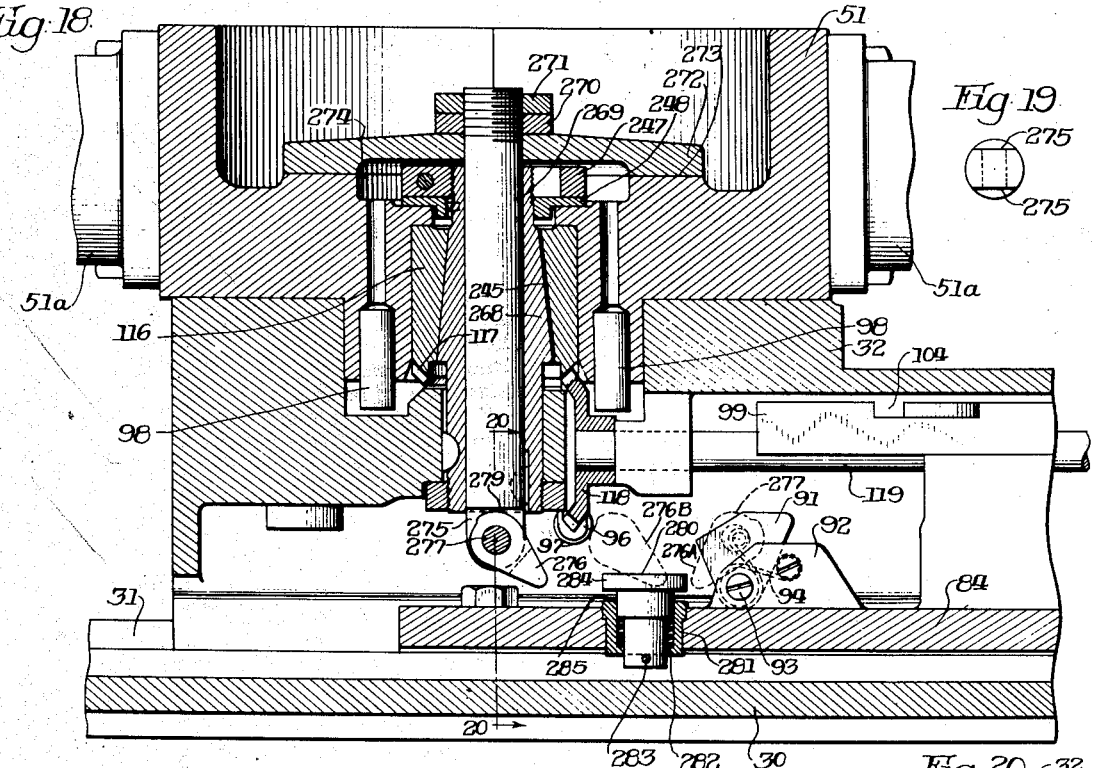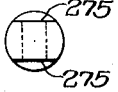

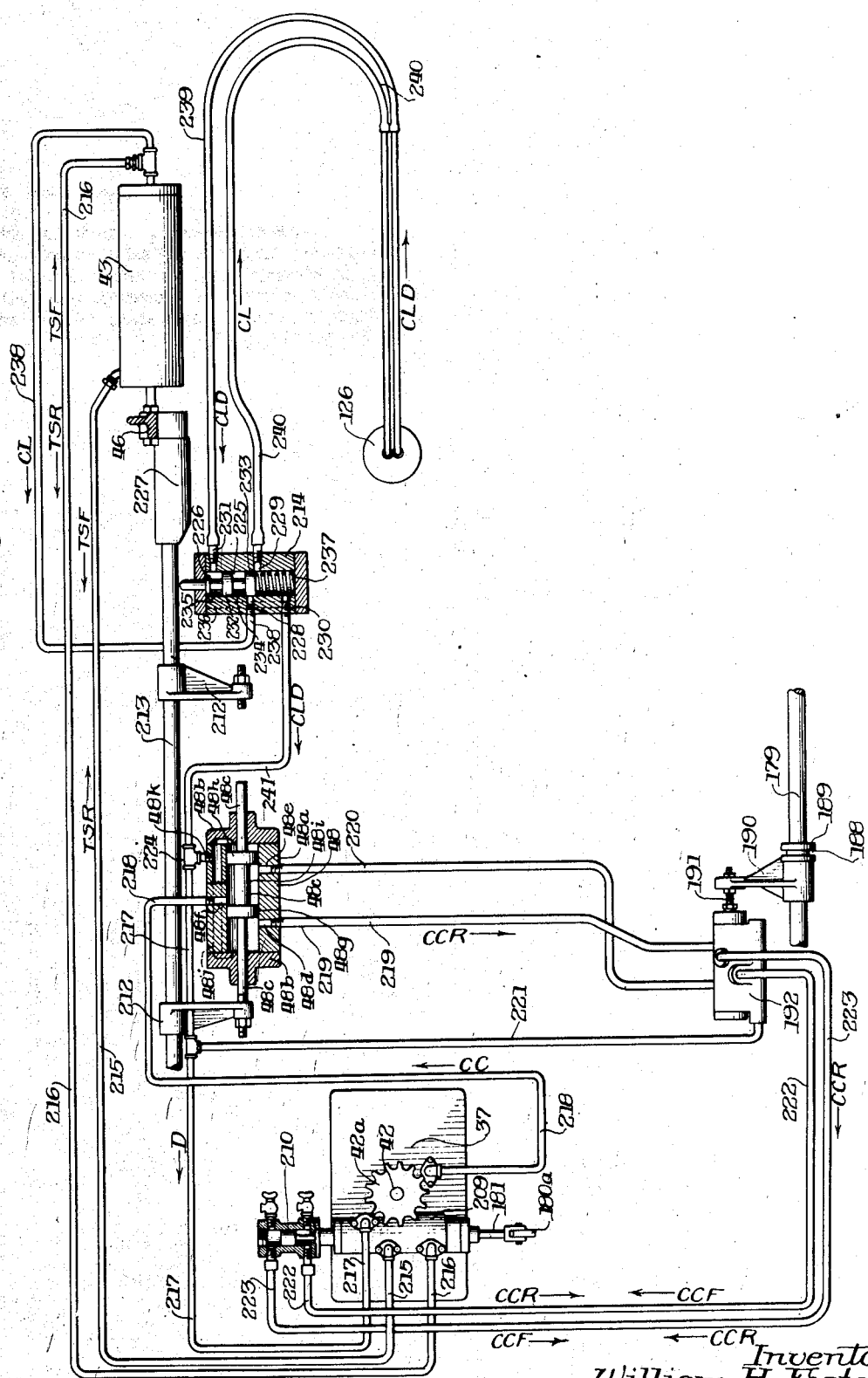

July 16, 1935.  W. H. FOSTER  2,008,010
TURRET LATHE
Filed April 4, 1929   12 Sheets-Sheet 11

Inventor:
William H. Foster
By Wilkinson, Huxley, Byron & Knight
Attys.

July 16, 1935.  W. H. FOSTER  2,008,010
TURRET LATHE
Filed April 4, 1929    12 Sheets-Sheet 12

Inventor
William H. Foster.
By Wilkinson, Huxley, Byron & Knight
Attys

Patented July 16, 1935

2,008,010

UNITED STATES PATENT OFFICE 2,008,010

TURRET LATHE

William H. Foster, Elkhart, Ind.

Application April 4, 1929, Serial No. 352,427

79 Claims. (Cl. 29—42)

The present invention relates to improvements in turret lathes.

The invention has been illustrated and will be described with particular reference to hydraulically or fluid pressure operated turret lathes. It will be clear, however, as the description proceeds, that certain features of the invention are of broader scope than hydraulically operated lathes.

An object of the present invention is to provide a turret lathe well adapted to meet the needs of commercial operation, which is adaptable for many classes of work, and which will conserve time in operation.

A further object is to provide a turret lathe adapted for expeditiously operating upon work requiring one or more operations.

A further object is to provide a turret lathe in which time loss between the completion of operations upon one piece of work and the starting of operations upon the next piece of work is reduced to a minimum.

A further object is to provide a turret lathe having improved cooperation between the cross slide or slides, and the moving turret.

A further object is to provide a turret lathe having the advantage that the operative, upon the operation of a simple instrumentality, may inaugurate a series of automatic operations and whereby the turret and cross slide movements will automatically stop at any point in the cycle of operations of said turret as predetermined by said operative.

A further object is to provide an automatically operating turret lathe having convenient means whereby the operative may readily stop operations at any point and may manually control the machine if he so desires.

A further object is to provide an automatic turret lathe of improved simplicity over prior structures.

A further object is to provide improved means for indexing and holding the turret of a turret lathe.

A further object is to provide an improved turret lathe in which the various movements are controlled by fluid pressure, preferably hydraulically.

A further object is to provide an automatic turret lathe provided with safety features whereby if for any reason the turret should not complete an indexing movement the mechanism will be stopped, whereby breakage will be avoided.

A further object is to provide an improved method of operating a turret or other type of lathe.

Further objects will appear as the description proceeds.

Referring to the drawings—

Figure 2 is a view in rear elevation of the lathe shown in Figure 1;

Figure 3 is a top plan view of the structure shown in the preceding figures;

Figure 4 is a sectional view taken along the planes indicated by the arrows 4—4 in Figures 1 and 3;

Figure 5 is a sectional view taken along the planes indicated by the arrows 5—5 of Figures 1 and 3;

Figure 6 is a sectional view taken along the plane indicated by the arrows 6—6 of Figure 3;

Figure 7 is a sectional view taken along the planes indicated by the arrows 7—7 in Figures 1 and 3;

Figure 8 is a sectional view taken along the plane indicated by the arrows 8—8 of Figure 3;

Figure 9 is a sectional view taken along the planes indicated by the arrows 9—9 of Figure 1;

Figure 9A is a sectional view taken along the plane indicated by the arrows 9A—9A of Figure 9;

Figure 10 is a sectional view taken along the plane indicated by the arrows 10—10 of Figure 1;

Figure 11 is a sectional view taken along the plane indicated by the arrows 11—11 of Figure 1;

Figure 12 is a sectional view taken along the plane indicated by the arrows 12—12 of Figure 11;

Figure 13 is a sectional view taken along the planes indicated by the arrows 13—13 of Figures 10 and 11;

Figure 13A is a view taken in the direction of the arrows 13A—13A in Figures 13 and 1; in other language Figure 13A represents a front view of a feed cam utilized in the illustrated embodiment of the present invention;

Figure 14 is a sectional view taken along the plane indicated by the arrows 14—14 of Figure 3;

Figure 14A is a sectional view taken along the plane indicated by the arrows 14A—14A of Figure 3;

Figure 15 is a view more or less diagrammatic in its nature showing certain control circuits of the instrumentalities disclosed in the preceding figures;

Figure 18 shows a further modification of part of the structure shown in Figure 14, the structure shown in Figure 18 being also applicable as a modification of the structure shown in Figures 16 and 17;

Figure 19 is a bottom plan view of part of the structure shown in Figure 18;

Figure 20 is a view in side elevation of part of the structure shown in Figure 18, said Figure 20 being taken in the direction of the arrow in Figure 18;

Figure 1:
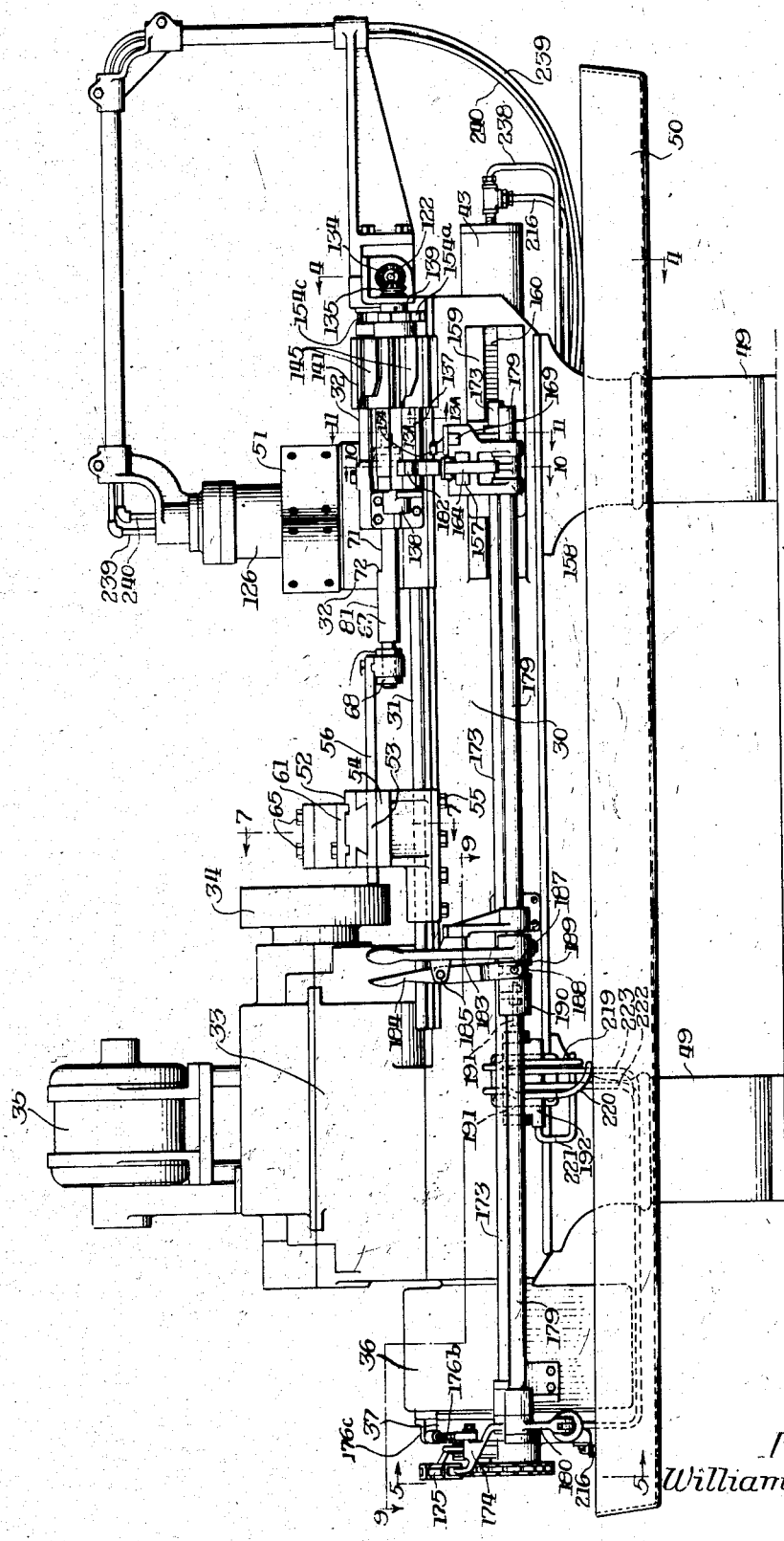
Figure 1 is a view in front elevation of a fluid pressure controlled turret lathe embodying the principles of the present invention.

A detailed description of the instrumentalities disclosed in the figures above mentioned may be prefaced by a short statement of part of the functions intended to be performed by said instrumentalities.

According to the present invention, the operative may by the operation of a simple instrumentality set the lathe into operation for performing a plurality of operations in succession upon a piece of work. The illustrated embodiments of the present invention include a turret having six stations, though a different number of stations may be chosen if preferred. The operative may, if the work requires it, so set his machine that the tools at the six stations will operate in succession upon the work, after which the turret movements will stop automatically; or, if preferred, the operative may so set his machine that tools at any predetermined less number of said stations will operate upon said work, after which the turret movements will stop automatically, if the operative has so set the mechanism; or, as may perhaps be preferred, the turret may rapidly move through the remaining stations of a cycle, after which the turret movements will be automatically stopped.

The present invention contemplates the use of cross slides which may be equipped with tools and which may at the option of the operative be connected to move in unison with the turret in one or more of the forward and backward movements of said turret in any cycle.

A few of the possibilities will be referred to. Suppose the operative desires to perform only one operation upon each piece of work. He will so set the mechanism that after he has operated the instrumentality referred to, the turret will advance to do its work and will retreat after said work has been accomplished. However, the parts will be so set that the range of travel during the retreating movement will not be sufficient to cause the indexing or turning of the turret. Therefore, after the operative has put in another piece of work, he may, by operating the instrumentality referred to, cause the same tool to advance toward the work and retreat. This movement of the turret may be accompanied by a movement of the cross slide, or cross slides, referred to, at the option of the operative.

Suppose two operations are to be performed upon a piece of work. The operative may, by operation of the instrumentality referred to, cause the turret to advance for the first operation, to retreat to a position to cause the indexing of the turret, to again advance for the second operation, and to again retreat. The mechanism may be so set that the machine will stop at the end of the retreating movement after the second operation. The third and fourth stations may be equipped with tools similar to the first and second stations, respectively, whereby when the operative again operates said instrumentality, working and retreating movements will be accomplished at the third and fourth stations exactly as described in connection with the first and second stations. The fifth and sixth stations may be equipped with tools similar to the first and second stations, respectively, whereby after the turret at its fourth station has performed its functions and stopped, the operative may change the piece of work to be operated upon and again operate said instrumentality, after which the turret at the fifth and sixth stations will automatically perform its working and retreating movements and stop, bringing the cycle to completion. It will be understood, of course, that if for reasons of economy in providing tools, or for any other reason, it is preferred not to equip the third, fourth, fifth and sixth stations, or any of them, with tools, the working and retreating movements of the turret may, at the option of the operative, be traversed rapidly, no cutting operations being accomplished.

If three operations are to be performed upon a piece of work, stations 1, 2 and 3 will be equipped with the tools necessary for performing said operations, and stations 4, 5 and 6 may be equipped with tools similar to stations 1, 2 and 3, respectively. The mode of operation will be readily understood from the discussion in connection with work in which two operations are to be performed.

If the work requires four operations of the turret, any four of the tool holders of the turret may be equipped with operating tools. The operative may, upon operating said instrumentality, cause the turret to successively proceed through its working and retreating movements for said four stations. At the other stations the turret may (providing the operative has so set the control mechanism) operate in its forward and retreating movements with a rapid traverse, whereby to conserve time, completing the cycle of the six round trips of the turret.

With reference to a piece requiring five operations, the action will be readily understood from the discussion in connection with the piece requiring four operations.

Referring now to the matter of operating cross slides in connection with turret movements toward and away from the work to be operated upon, the present invention contemplates means which may be rendered operative at the option of the operative for providing a connection between each cross slide and the turret slide for causing movement of the corresponding cross slide in unison with the turret slide.

As intimated above, the present invention also contemplates means for causing rapid movement of the turret slide and the cross slides when such rapid movements are desirable and causing slower speeds when such slower speeds are desirable as, for example, during cutting operations. Accompanying the means just referred to are adjustable means for automatically controlling the rate of feed during the cutting or feeding movements, the rate of feed being selectable at the option of the operative.

It will be readily understood that in an automatically operating machine, means should be provided whereby the operative may eliminate the automatic control and substitute manual control at his option. For example, if he sees that something is wrong about the setting of his work or his tools, or about any part of the mechanism, he should have the option of manually controlling the moving of the parts to such positions as he may select, within the range of the machine. Also, in setting his tools after grinding or in making the original set-up, he should have the option of manually controlling the mechanism to move the tools to any predetermined position within the range of the machine. The instrumentalities illustrated provide the advantages referred to.

If for any reason the turret should fail to complete an indexing movement from one station to another (as for example if a chip should be interposed in the indexing mechanism or if the operative in manually operating the mechanism should not fully complete the indexing movement), the parts should be prevented from operation, whereby to prevent breakage. The present invention contemplates simple mechanism for accomplishing this safety feature by preventing the forward movement of the turret until indexing has been completed. The present invention also contemplates improved means for positively clamping the turret in position after each indexing movement and for unclamping said turret prior to the succeeding indexing movement.

Referring now to a description of the instrumentalities appearing in the figures of the drawings, reference may first be made to Figures 1, 2 and 4. The numeral 30 indicates a bed having the V-shaped ways 31—31 (Fig. 4), which ways 31—31 slidably support a turret slide 32, which turret slide is adapted to be positively moved longitudinally of said ways 31—31 by means of a fluid pressure, preferably a hydraulic, cylinder, which will be referred to presently. Disposed at the head end of the machine, that is—the left end, as the parts are viewed in Figures 1 and 3 and the right end as the parts are viewed in Figure 2, is the headstock 33. Said headstock 33, according to usual practice, contains gear mechanism (not shown) connected up to a chuck 34 adapted to hold the work to be operated upon. In the illustrated embodiment of the present invention the headstock 33 has mounted thereon the electric motor 35 adapted to drive the mechanism within said headstock 33. Disposed to the left of the headstock 33 as the parts are viewed in Figures 1 and 3 and to the right of said headstock as the parts are viewed in Figure 2 is the fluid reservoir 36. Cooperatively associated with said reservoir 36 is the fluid pump 37, said fluid pump in the illustrated embodiment of the present invention being disposed for the most part within said reservoir 36. Said electric motor 35 is connected up to the pump 37 for driving said pump through any preferred power transmitting mechanism. By reference to Figures 2, 3 and 5, it will be noted that a counter-shaft 38 is disposed in parallel relationship with the axis of the motor 35. Said counter-shaft may be driven through a sprocket chain (not shown) from said motor 35. A sprocket chain 39 transmits power from said counter-shaft 38 to the shaft 40, which through the sprocket chain 41, transmits power to the shaft 42 of the pump 37 (Fig. 5). Said shaft 42 is provided with the sprocket 42A (shown in Figures 5 and 15). Said pump is connected through a series of piping, which will be referred to more in detail presently, to the operating cylinder 43, said piping and said cylinder being clearly indicated in Figure 2, and other figures. By reference to Figure 2 it will be noted that the operating cylinder 43 is provided with a plunger 44 having a screw-threaded extremity 45. Said screw-threaded extremity 45 is connected to the bracket 46, which bracket is rigid with the turret slide 32. Adjustment of the bracket 46 relative to the plunger 44 may be had through manipulation of the lock nuts 47—47 cooperating with the screw-threaded extremity 45 and said bracket 46. The numeral 48 (see Fig. 2) illustrates a control valve for controlling the connections of the operating cylinder 43 with the fluid pump 37. The functions of said control valve 48 will be referred to more in detail presently. The valve 48 and the parts associated therewith are shown exaggerated in size relative to some of the other elements of the turret lathe. Said valve 48 includes the casing 48a (see Fig. 15), the cylinder heads 48b—48b and the plunger 48c. Said plunger 48c has its extremities extending beyond the two cylinder heads 48b—48b. Said casing 48a is provided with the ports 48d and 48e and the port 48f. Said ports 48d and 48e are spaced from one another and the port 48f is intermediate of said ports 48d and 48e. The plunger 48c is provided with the enlarged portions 48g and 48h spaced apart to form the annular recess 48i. The spaces at the two ends of the casing are connected together through the passageway 48j, which passageway communicates with the port 48k. By shifting the plunger 48c, communication may be controlled between port 48f and either port 48d or 48e. As will be explained hereinafter, it is possible to control the plunger 48c to accurately control the area of opening of either port 48d or 48e for accurate control of the turret lathe.

Referring to Figures 1 and 2, it will be noted that the bed 30 of the lathe is supported upon the legs 49—49, said legs also supporting a drip pan 50 underlying the operative parts of the lathe, whereby to catch drippings of oil or cuttings of material. Moreover, in accordance with usual practice, said pan comprises a sump for cooling lubricant to be applied to the tools while they are performing their cutting operations. The tools are not illustrated in detail in the present application, inasmuch as the particular tools form no part of the present invention. Neither does the present application illustrate a pump for delivering lubricant to said tools.

Rotatably carried by the turret slide 32 is the turret 51, which according to the disclosure of the present application is hexagonal in plan view (see Fig. 3). The six faces of the turret 51 are, in accordance with turret lathe practice, adapted to be brought successively into right angular relationship with the axis of the chuck 34. As shown in Figure 3, each face of the turret 51 is adapted to have removably secured thereto a tool holder 51a. Certain of said tool holders 51a are shown as being provided with tools 51b. Two of said tool holders 51a are shown as provided with pilot bars 51c adapted, according to usual turret lathe practice, to ride within corresponding sleeves for steadying the tool during its cutting operation. The present invention contemplates improved means for indexing said turret, for automatically moving said turret in its advancing and retreating movements longitudinally of the lathe and for clamping the turret against rotative movement except when indexing is to be accomplished.

The numerals 52—52 indicate cross slides (Figs. 1, 2, 3 and 7), which cross slides are mounted for transverse movement upon supporting members 53—53, adapted to be bolted or otherwise secured to the bridging member 54 (see particularly Fig. 7), which bridging member is adapted to be adjustably secured to the bed 30 by means of bolts 55—55, or other preferred securing means. Said cross slides 52—52 are adapted to be moved transversely of the lathe in unison with longitudinal movements of the turret slide 32, though, as will appear presently, the connection between the cross slides 52—52 and the turret slide 32 may or may not be had, according to the predetermined setting, at the option of the operative. By reference to Figures 3 and 7 it will be noted that each supporting member 53 has slidably disposed therein a cam plate 56, each of which cam plates is provided with a cam slot 57. By reference to Figure 7 it will be noted that each cam slide 57 houses a roller 58 carried at the lower extremity of a stud 59 secured within the corresponding cross slide 52. Said studs 59—59 are screw-threaded into the corresponding cross slides 52—52, downward movement of said studs being limited by shoulders 60—60, which bottom upon corresponding annular shoulders in the cross slides 52—52. The numerals 61—61 indicate tool adjusting brackets, which are bolted to the cross slides 52—52. The numerals 62—62 indicate tool holders connected to the cross slides 52—52 by means of the tongues 63—63. Bolts 64—64 secure said tool holders in rigid relationship with the cross slides 52—52. The numerals 65—65 indicate tools carried by the tool holders 62—62. The positions of said tools 65—65 may be adjusted by means of the adjusting bolts 66—66. The cam plates 56—56 are connected to rods 67—67 (see Figs. 2, 3 and 8), which rods are adjustable relative to said cam plates 56—56 by means of the nuts 68—68 (Figs. 2 and 8).

The means for operating the rods 67—67 will now be described. Each rod 67 extends through an aperture 68 (see Fig. 8) in the turret slide 32. The rear extremity of each rod 67 is screw-threaded for the reception of a nut 69 adapted to be engaged by a portion of the turret slide 32 as said turret slide moves in a retreating direction away from the chuck 34. The numeral 70 indicates a lock-nut for the nut 69. The rod 67 is provided with a flat portion 71, the forward extremity of which is defined by the shoulder 72. Said shoulder 72 of each rod 67 is adapted to be engaged by the resiliently controlled pin 73 disposed within a suitable aperture in the turret slide 32. Said pin is adapted to have a movement of reciprocation within the sleeve 74, being urged downwardly within said sleeve by means of the spring 75. The sleeve 74 is urged upwardly by means of the spring 76. The upper extremity of said spring 75 abuts against a plug 77 threaded into the upper extremity of the sleeve 74. Downward movement of the pin 73 within the sleeve 74 is limited by the stud 78, which rides within a vertical slot in the sleeve 74. As indicated above, the spring 76 normally holds the sleeve 74 in its uppermost position. Said sleeve 74 and pin 73 under normal conditions operate as a unit, the resilient connection between said pin 73 and sleeve 74 being provided for abnormal conditions, which will be referred to presently.

Disposed on the under side of one or more of the tool holders 51a—51a are shoes 79—79, disposed in position to overlie the sleeves 74 and pins 73. The advancing side of each shoe 79 is provided with a beveled surface 80 whereby the sleeve 74 with its pin 73 will be pushed downwardly against the influence of the spring 76 when the turret has moved to a position such that a shoe 79 engages the upper extremity of a sleeve 74. By reference to Figure 3 it will be noted that the pin 73 cooperating with the rod 67 in the lower half of the figure is closer to the axis of rotation of the turret 51 than is the pin 73 cooperating with the rod 67 in the upper half of said figure. This construction will also be clear from Figure 6. It will be understood without detailed explanation that if it is intended that a shoe 79 shall operate the pin 73 shown in the lower half of Figure 3, it will be so disposed upon the tool holder 51a as to engage the particular sleeve which houses said pin 73. Likewise if it is intended that a shoe 79 shall operate the pin 73 shown in the upper half of Figure 3, said shoe will be disposed in a position on the under side of the tool holder 51a to engage the sleeve housing that particular pin 73. Expressed in other language, the radial distance of a shoe 79 from the axis of rotation of the turret 51 will be chosen to cooperate with the particular pin 73 which is to be controlled by that shoe. The shoes will, of course, be chosen of such a width that each will operate only the particular pin 73 with which it is intended to cooperate. Figure 6 shows 2 shoes 79—79 upon a single tool holder. The left hand shoe is adapted to engage the sleeve 74 which houses the pin 73 at the right hand side of Figure 6 while the right hand shoe 79 is adapted to engage the sleeve 74 which houses the pin 73 at the left hand side of Figure 6 and is illustrated as actually engaging its corresponding sleeve 74.

It will be clear from an inspection of Figure 8 that as the turret slide advances toward the left as the parts are viewed in said figure, and assuming that a shoe 79 is holding the pin 73 in its lowermost position, said pin will, when it engages the shoulder 72, cause the movement of the corresponding rod 67 toward the left, carrying the cam plate 56 toward the left.

Referring now to Figures 3 and 7, it will be clear that by reason of the engagement of the roller 58 within the cam slot 57 a transverse feeding movement will be communicated to the corresponding cross slide 52. Reverse movement of the turret slide 32 will result in the engagement of said turret slide 32 with the nut 69 associated with the rod 67 (see Fig. 8), resulting in the withdrawing of said rod and the consequent withdrawing of the cam plate 56, said withdrawing of the cam plate 56 being accompanied by the withdrawal in a transverse direction of the cross slide 52.

Referring now to the reason for resiliently mounting the pin 73 within the sleeve 74, it may be stated that if through some error of adjustment a shoe 79 should engage the top of a sleeve 74 while the pin 73 is on the high part of a rod 67, as for example the part 81 (see Fig. 8), the spring 75 will give, avoiding the communication of destructive stresses to said pin 73 and its associated parts. It will be understood that each tool holder 51a is adapted for attachment of a shoe 79. Said shoes will, of course, be located at the proper positions to cause operation of the rods 67 and consequent operation of the cross slides 52 when the turret 51 is in predetermined positions. Therefore the cross slides may be operated in conjunction with one or more of the tools mounted in the tool holders 51a—51a.

The means for indexing the turret 51 will now be described, particular reference being had to Figures 3, 14 and 14A. By reference to said figures it will be noted that the turret 51 is provided on its under side with six recesses 82—82. Said recesses 82 are preferably conical and are provided by bushings 83—83 located in the under side of turret 51. (See Fig. 14A.) Adjustably carried by the bed 30 is the index plate 84 said index plate being adjustably secured to said bed 30 by any preferred holding means. Said index plate includes a housing for certain locking mechanism which will now be described. The numeral 85 indicates a vertically disposed bushing which houses a reciprocable locking bolt 86 having a frusto-conical upper extremity adapted to cooperate with each of the frusto-conical recesses 82—82. Said bushing 85 is provided with a threaded plug 87 at its lower extremity, which plug constitutes an abutment for a spring 88, which normally thrusts the bolt 86 upwardly. A lever 89 pivoted for movement about the axis 90 is provided, one extremity of which is seated within a hole in the bolt 86. It will be understood that if the lever 89 is swung in a counter-clockwise direction as the parts are viewed in Figures 14 and 14A, said lever will result in the retraction of the plunger 86 from engagement with the turret 51. Means for swinging the lever 89 in the counter-clockwise direction referred to are embodied in the pivotally mounted trip 91, which trip 91 is swingingly carried by the boss 92 forming part of the index plate 84. Said trip 91 is adapted to swing about the axis of the pin 93 and is normally urged in a clockwise direction by the spring 94, the two extremities of said spring 94 reacting against the boss 92 and the trip 91. The boss 92 is provided with the pin 95, which has the double function of forming an abutment for the spring 94 and of limiting the swinging movement of the trip 91 in a clockwise direction as the parts are viewed in Figures 14 and 14A. The right end of the lever 89 as the parts are viewed in Figures 14 and 14A is provided with a finger 96 having a roller 97 rotatably carried at its extremity. As the turret slide 32 moves to the right as the parts are viewed in Figures 14 and 14A, the roller 97 is adapted to ride up upon the trip 91 to swing the lever 89 in a counter-clockwise direction, resulting in the unlocking of the bolt 86 with reference to the turret 51.

By reference to Figures 3 and 14 it will be noted that the turret 51, on its under side, is provided with six downwardly extending indexing pins 98, which are secured in corresponding apertures in the under side of said turret 51. Said six pins correspond with the six faces of the turret. If the turret should have a different number of faces, the number of pins would be correspondingly changed. Said pins 98—98 are adapted to cooperate successively with the pawl 99, which is rigidly carried by the swingingly mounted pin 100 (see Fig. 14). Said pin 100 is rotatably mounted within the boss 101 carried by the index plate 84. Said pin 100 and consequently the pawl 99 are biased by means of the spring 102 to a position wherein the swinging extremity of the pawl 99 is adapted to successively engage the lower extremities of the pins 98—98. The swinging extremity of the pawl 99 is preferably grooved, as indicated by the dotted line 103, for receiving each pin 98 in succession. It will be understood without detailed explanation that as the turret slide 32 is moved to the right as the parts are viewed in Figure 14, that is—in the retreating movement thereof, one of the pins 98 will engage the swinging extremity of the pawl 99. The parts are so designed relative to one another that prior to the instant that engagement is effected between a pin 98 and the pawl 99, the roller 97 will have engaged the trip 91, resulting in the counter-clockwise movement of the lever 89 as the parts are viewed in Figure 14, withdrawing the locking bolt 86 from locking engagement with the turret 51. The present invention contemplates certain fluid pressure (preferably hydraulic) clamping of the turret 51, which will be referred to in detail presently. It may be stated at this point that the clamping effect is released prior to the instant that engagement is effected between a pin 98 and the pawl 99. The turret, now being free to rotate, is moved around with a movement of rotation, that is—in an indexing movement, as the turret slide 32 and the turret 51 continue to move to the right as the parts are viewed in Figure 14, which is to say—in the retreating movement of the turret. Immediately after the roller 97 passes over the trip 91, the lever 89 is allowed to move in a clockwise direction as the parts are viewed in Figures 14 and 14A under the influence of the spring 88. Such clockwise movement of the lever 89 will be only a small amount at this time, inasmuch as the upper extremity of the locking bolt 86 will engage an imperforate portion of the under side of the turret 51. As the turret slide 32 and turret 51 continue further to the right as the parts are viewed in Figures 14 and 14A, the turret will be caused to continue further in its indexing movement due to the engagement of the pin 98 with the pawl 99, until a recess 82 comes into alignment with the locking bolt 86, at which instant said locking bolt will snap into said recess, locking the turret in proper position for the next advancing stroke. While the turret 51 is being rotated due to engagement of a pin 89 with the pawl 99, the next succeeding pin 89 will be moving into proximity to said pawl 89. In order to accommodate said next succeeding pin, the upper side of the pawl 99 is provided with the groove 104, whereby there will be no interference between said next succeeding pin 98 and said pawl 99. It will be understood, of course, that as the turret rotates, the pawl 99 will be swung about the axis of the pin 100. The pawl 99, being biased by the spring 102 into a position for cooperation with said next succeeding pin 98, will be ready for causing indexing movement of the turret 51 upon the next succeeding retreating movement of said turret.

After the turret slide 32 and turret 51 have retreated sufficiently far to cause the complete indexing of the turret, certain fluid pressure control circuits, to be referred to hereinafter, will be operated to cause the forward or advancing movement of said turret slide 32 and turret 51. As will be explained hereinafter, part of said advancing movement may be at a relatively high or rapid traverse rate and the remainder of said advancing movement may be at a rate proper for the cutting operation to be performed during said advancing movement. During said advancing movement of the turret slide 32, the roller 97 will of course engage against the right-hand side of the trip 91 as the parts are viewed in Figures 14 and 14A. By reason of the spring-pressed pivotal connection of the trip 91 with the boss 92, said trip will be caused to move in a counter-clockwise direction to allow the roller 97 to pass, after which said trip 91 will be moved, under the influence of the spring 94, back to its operative position, as shown in Figures 14 and 14A.

As indicated above, the present invention contemplates a safeguard for preventing the advancing movement of the turret in the event that said turret has not been fully indexed, that is—if the turret has not been properly located in position with the locking bolt 86 seated within one of the recesses 82 in the under side of the turret 51. The mechanism comprising said safeguard will now be described. It will be noted from an inspection of Figures 14 and 14A that the indexing plate 84 is provided with an abutment 105, which may be made of relatively hard and tough steel. Said abutment 105 is illustrated as being secured to the index plate 84 by means of bolts 106—106. Mounted within a suitable bore in the under side of the turret slide 32 is a plunger 107, which plunger is spring-pressed downwardly by means of the spring 108. Said plunger 107 has its lower extremity provided with the beveled surface 109 adapted to ride over the abutment 105 in the retreating movement of the turret slide 32. The forward side of the plunger 107 is provided at its lower extremity with the flat face 110 adapted to engage against the rear side of the abutment 105. The plunger 107 is provided with the recess 111 adapted to receive one extremity of the lever 112 pivoted about the axis of the pin 113 carried by the turret slide 32. The other extremity of the lever 112 engages against the under side of the lever 89, as shown in Figures 14 and 14A. The parts are so proportioned that at such time as the plunger 86 is in its lowermost or unlocking position, the spring 108 is allowed to project the plunger 107 sufficiently far down so that the flat face 110 of said plunger is in abutting relationship with the rear face of the abutment 105. Under these conditions, that is—when the turret 51 is unlocked, the plunger 107, due to its abutting relationship with the abutment 105, effectually prevents the forward or advancing stroke of the turret slide 32. Said plunger, as well as the abutment 105, will be made of relatively hard and tough material well adapted to stand the stress set up by the operating cylinder 43 (Figs. 2, 3 and 4). It need not be explained that the propelling fluid pressure system will be so designed that if obstructions should be encountered, the fluid in the fluid pressure system will be allowed to by-pass, rather than cause breakage of the parts. It need not be explained that the parts will in practice be so adjusted that the by-passing function referred to will occur when stresses are encountered well above those expected in normal operation. If, therefore, a chip should enter the indexing mechanism and prevent the proper indexing of the turret 51, or, if the operative should assume manual control of the mechanism and attempt to cause the forward or advancing movement of the turret before said turret has been completely indexed, such forward movement of the turret will be prevented by reason of the engagement of the plunger 107 with the abutment 105. Not until the locking bolt 86 has seated itself within one of the recesses 82 in the turret 51 (see Fig. 14A) will the plunger 107 be swung upwardly to a height to clear said abutment 105.

The means above referred to for clamping the turret will now be described, particular reference being had to Figures 2 and 14. The clamping means referred to is responsive to the pressure within the fluid pressure system, which will be described in detail presently. For the purpose of describing the clamping functions in Figures 2, 14 and 16, it may be explained that the turret slide 32 is provided with an upstanding stud 114. Said stud 114 comprises a bearing for the indexing movement of the turret 51. It will be noted that the stud 114 has a tapered portion 115, which provides a bearing for the bushing 116, said bushing having a tapered interior surface bearing upon said tapered portion 115. Said bushing 116 is non-rotatably secured to the turret 51, and in the embodiment of the invention illustrated in Figure 14, said bushing is provided at its lower extremity with teeth, indicated by the numeral 117, which mesh with the beveled gear 118. Said beveled gear 118 is secured to the longitudinally extending indexing shaft 119, which through the beveled gears 120 and 121 communicates movement to the cross shaft 122, also shown in Figure 4. The function of said cross shaft 122 and the means for driving same will be referred to presently when the automatic indexing features of the present invention are described.

Secured to the stud 114 and forming a continuation thereof is the piston rod 123. Said piston rod 123 is illustrated as having a threaded extremity engaging with a corresponding aperture in the stud 114. Said stud 114 is shown as externally threaded at its upper extremity for the reception of a nut 124 which limits upward movement of the turret 51, reacting through a washer 124a. Said piston rod 123 is provided with the piston 125 having a sliding fit within the cylinder 126. Said cylinder has the cylinder head 127 secured thereto by means of bolts 128 or other preferred securing means. Intermediate of the length of the cylinder 126 is the wall 129 comprising a cylinder head at the opposite side of the piston 125 from the cylinder head 127. Below the wall 129 is the annular shoulder 130 adapted to have clamping relationship with the upper surface of the turret 51. The cylinder head 127 and the cylinder head 129 are each provided with bushings 131—131 for preventing leakage around the piston rod 123. The piston rod 123 is provided in its upper extremity with the bores 132 and 133. Said bore 132 communicates with the space on the upper side of the piston 125 and the bore 133 communicates with the space on the under side of the piston 125.

Figure 16:
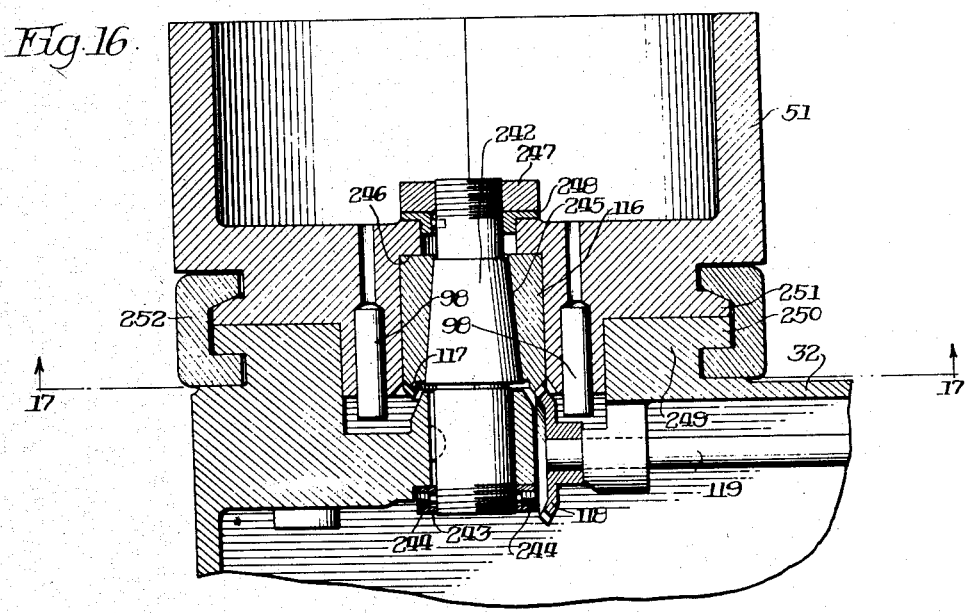
Figure 16 is a view of a modification of part of the structure shown in Figure 14, said Figure 16 being taken along the plane indicated by the arrows 16—16 of Figure 17.
Figure 17:
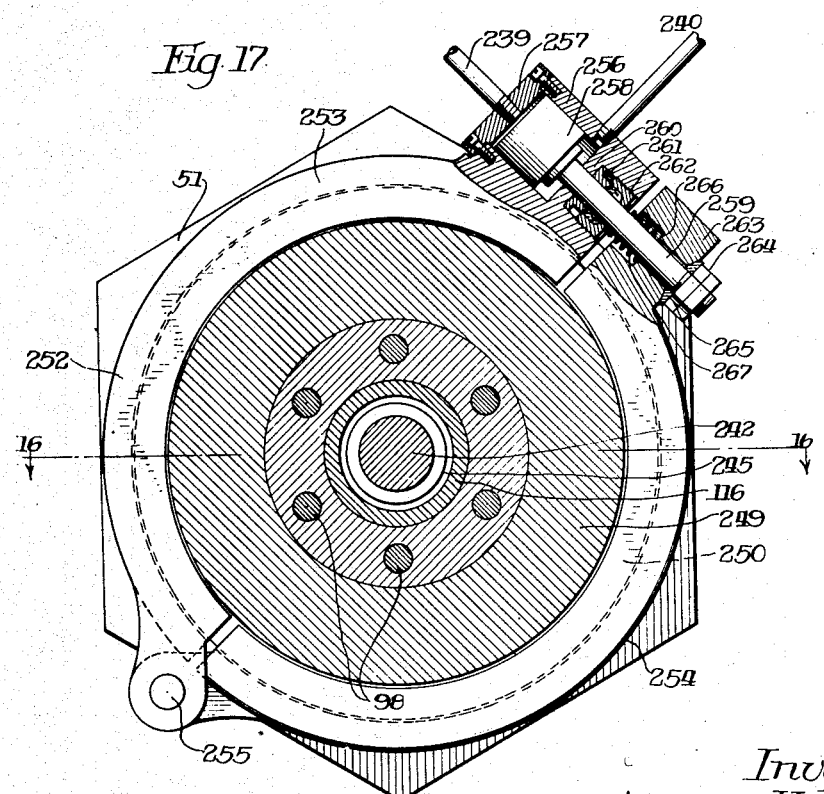
Figure 17 is a sectional view taken along the plane indicated by the arrows 17—17 of Figure 16.

The clamping action of the mechanism shown in Figure 14 will be clear without detailed explanation. Assuming that the fluid under pressure is admitted to the bore 133, a reaction will occur between the relatively fixed piston 125 and the upper surface of the cylinder head 129, causing a resultant force exerted between the annular shoulder 130 and the upper surface of the turret 51. Inasmuch as it is at the present time a practical impossibility to absolutely prevent leakage of fluid under pressure past a sliding piston, the bore 132 is provided to allow fluid which has leaked past the piston 125 to return to the source of fluid supply. Conversely, when pressure is released upon the fluid within the bore 133, the clamping relationship between the annular shoulder 130 and the turret 51 will be released. The only clamping effect of said annular member 130 will be that resulting from the weight of the cylinder 126 and the parts carried thereby, which weight would not be sufficient to interfere in any practical sense with the indexing of the turret 51. The control system for controlling access to the bores 132 and 133 will be described presently. Moreover, modifications of the clamping mechanism which are illustrated in Figures 16, 17 and 18 will be described presently.

The means for automatically controlling the advancing and retarding movements of the turret slide and the consequent indexing of the turret will now be described, reference being had to Figures 1, 3, 4, 5, 10, 11, 12 and 14. As indicated above in connection with the description of the mechanism shown in Figure 14, the turret 51 is connected up through the beveled gear 118, shaft 119 and beveled gears 120 and 121 to the cross shaft 122. By reference to Figure 4 it will be noted that the cross shaft 122 is provided with the beveled gear 134 meshing with the beveled gear 135. Said beveled gear 135 is fast to a reduced extremity 136 of an indexing or cam drum 137. Said indexing or cam drum 137 is rotatably carried by the bracket 138 at the forward extremity of said drum 137 and by the bracket 139 at the rear extremity of said drum (see Figures 1 and 6). Said brackets are rigid with the turret slide 32. It will be clear that the indexing or cam drum 137 moves in unison with the turret 51 and that cams or equivalent members carried by said drum 137 may be utilized to control operating circuits in correspondence with the various stations of the turret 51.

As clearly shown in Figures 10 and 11 and other figures, the cam drum is provided with a plurality of longitudinally extending tenons 140. Said tenons are adapted to receive and to support feed cams, or cam blocks, 141—141 (see Figs. 1, 4 and 11 and other figures). Said feed cams or cam blocks 141 may be anchored in place upon the tenons 140—140 by means of setscrews 142. Each of the feed cams or cam blocks 141 presents a flat surface 143 disposed in right-angular relationship with the radial plane of the cam drum 137 which radial plane is symmetrically disposed relative to the corresponding tenon 140. Each cam plate 141 also presents a shouldered surface 144 at right angles to the surface 143. Seated upon the surface 143 of one or more of the feed cams 141 is a cam plate 145. Said cam plate is shown in Figure 13 as being provided with three slots 146 disposed in spaced relationship with one another, said slots having their length disposed transversely of the corresponding cam plate 145. Bolts 147 extend through the outermost of said three slots 146—146. Said bolts 147—147 have their heads 148 disposed in recesses 149—149 bounding said outermost slots 146—146, whereby said bolts 147 will not present any obstructions beyond the outer surface of the cam plates 145—145 (see Fig. 11). This structure is preferred for the purpose of preventing interference with a certain roller, to be described presently, adapted to engage with the surfaces 144—144 of the various feed cams or cam blocks 141—141. By reason of the outermost slots 146—146, each cam plate 145 may be secured in adjusted relationship transversely of the surface 143. Setscrews 150—150 are provided for facilitating the adjustment referred to. The middle slot 146 in the cam plate 145 provides access to the setscrew 142, whereby it is possible to manipulate said setscrew for adjusting the corresponding feed cam or cam block 141 longitudinally of the drum 137, when desired, without disturbing the relationship between the cam plate 145 and the feed cam or cams block. It will be noted that the advancing face of the cam plate 145 is beveled off, as indicated by the numeral 151, (the longitudinal working surface being indicated by the numeral 151a), and that the outer extremity of each feed cam 141 is beveled on its advancing face as indicated by the numeral 152 (see Figs. 13 and 13A).

The surface 144 with its beveled off end portion 152 of each feed cam is adapted to cooperate with a roller 153 (Figs. 10, 12 and 13). The cam plate 145 with its beveled front face portion 151 associated with each feed cam is adapted to cooperate with a roller 154.

In order to obviate difficulties due to backlash in gearing and the like, the present invention contemplates means for positively positioning the cam drum 137 in predetermined position relative to each station of the turret 51. By referring to Figures 3 and 4 it will be noted that the drum has rigidly connected therewith the ratchet plate 154a, which ratchet plate has teeth 154b equal in number to the stations of the turret 51, that is—in the illustrated embodiment of the present invention—six ratchet teeth 154b. The numeral 154c indicates a swinging pawl pivotally carried by the turret slide 32. Said pawl 154c is biased into engaging relationship with the ratchet plate 154a by means of the spring 154d. The swinging extremity of the pawl 154c is beveled, whereby to provide piloting means, which will be operative in case the drive connection between the turret 51 and the cam drum 137 should not move said cam drum to quite its proper position. Expressed in other language, if the driving connection between the turret 51 and the cam drum 137 should not cause the cam drum to rotate in a counterclockwise direction (as the parts are viewed in Figure 4) to quite its proper position, the extremity of the pawl 154c will, under the action of the spring 154d, pilot itself into proper relationship with the corresponding tooth 154b, moving the drum through the increment of rotary movement necessary to properly position said drum 137. The drum 137 is ordinarily well balanced, and operates in relatively small bearings, so that the piloting action referred to is accomplished without requiring any great strength in the spring 154d. Moreover, the spring is never called upon to start the rotation of the drum 137 from rest, but merely follows up the motion of the drum 137 resulting from the drive connection between said drum 137 and the turret 51. The pressure of rollers 153 and 154 is in a direction tending to move the drum in a clockwise direction as the parts are viewed in Figure 4. Therefore, the net effect of the rollers 153 and 154 and the pawl 154c is to positively locate the drum 137 in its proper adjustment for each station of the turret 51.

The mechanisms carrying said rollers 153 and 154 will now be described. Referring to Figure 10, it will be noted that the roller 153 is rotatably carried at the swinging extremity of a lever 155, which lever 155 is swung about the axis of a pin 156. Said pin 156 for swingingly mounting the lever 155 is mounted in a sliding member 157, which sliding member 157 is carried by the bracket 158, which, as shown in Figure 1, is adjustably carried by the bed 30 of the lathe. The means by which the bracket 158 is supported by the bed 30 includes the part 159 provided with the T slot 160. Said T slot is shown also in Figure 4. Bolts 161 (see Figs. 4 and 11) hold the bracket 158 in rigid adjustable relationship with the bed 30. Slidably carried by the sliding member 157 is the plunger 162, which plunger is urged to the right as the parts are viewed in Figure 10 by means of the spring 163. The outer extremity of the plunger 162 is connected to the handle 164, which handle is pivotally connected about the axis of the pin 165 to the sliding member 157. The connection between the plunger 162 and the handle 164 is provided through a pin 166 and a slot 167 (Figs. 10 and 11), permitting action of the plunger 162 without any binding.

The roller 154 is rotatably carried by a boss 168 carried by the sliding member 169 (Figs. 11 and 13), which member 169 is slidably carried by the bracket 158 above described. The inner extremity of the sliding member 169 is bifurcated, as indicated by the numerals 170—170 (see Fig. 12), for the reception of the lever 171. Disposed in the bifurcations 170—170 in the sliding member 169 is the pin 172, which pin is disposed in the open-ended slot 172a in the upper extremity of the lever 171 (see Figs. 11 and 12). It will be understood that as the sliding member 157 is moved crosswise in response to movement of the roller 154 controlled by the various cam plates 145—145, the lever 171 will be caused to oscillate, the degree of oscillation depending upon the design or adjustment of said cam plates 145. Said lever 171 is secured to the shaft 173 (Figs. 1, 5 and 11). By reference to Figure 1 it will be noted that the shaft 173 extends substantially the length of the lathe, the forward extremity of said shaft 173 having secured thereto the lever 174 (see Figs. 1 and 5). Said lever 174 is connected through the adjustable strut 175 to the adjusting arm 176 of the pump 37.

Said lever 174 is resiliently urged in a clockwise direction as the parts are viewed in Figure 5 by a spring 176a which is mounted on a rod 176b pivoted to the lever 174. Said rod 176b has a sliding movement relative to a bracket 176c which bracket through the medium of a washer 176d constitutes an abutment for said spring 176a. The other end of said spring 176a abuts against a shoulder fast relative to the rod 176b. The swinging extremity of the rod 176b is threaded for the reception of adjusting nuts 176f by means of which movement of the lever 174 in a clockwise direction is limited. Consequently roller 154 (which moves with lever 174) may be held within prescribed limits of travel within the range of the cam plates 145. The incidental advantage is had that unnecessary range of movement of the adjusting arm 176 is avoided. It will be clear, therefore, that the cam plates 145—145 cooperating with the roller 154 will control the pump 37 to adjust the speed with which the turret slide is moved.

Referring back to the sliding member 157, it will be noted from an inspection of Figure 10 that the under side of said sliding member 157 is provided with a notch 177 receiving the swinging extremity of the rocking lever 178. Said lever 178 is secured to the shaft 179 (Figs. 1, 4 and 10), which shaft, it will be noted from an inspection of Figure 1, extends substantially the length of the lathe in parallel relationship with the shaft 173. Said shaft 179 at the forward end of the machine has secured thereto the lever 180 (see Figs. 1, 4 and 5). Said lever 180 is connected by means of the link 180a to the reciprocating rod 181, which controls the operation of the pump 37. The mechanism controlled by the rod 181 is part of the control mechanism for the pump 37 and need not be described herein, pumps having means for controlling the output thereof being readily purchasable in the open market. It may be stated briefly, however, that it is preferred that the rod 181 will control the pump 37 for five different conditions, to wit: (a) pumping a full quantity of fluid per unit of time in one direction for rapid traversing movement of the turret slide 32; (b) pumping a lesser quantity of fluid per unit of time for feeding movement of the turret slide 32; (c) neutral position of pump control; (d) pumping a lesser amount of fluid per unit of time for feeding movement in the opposite direction from that referred to in "(b)" above; (e) pumping the full amount of fluid per unit of time for rapid traverse in the opposite direction from that referred to in "(a)" above.

The movement of the shaft 179 and consequently the control rod 181 as immediately above referred to may be controlled by means of the handle 164 (Figs. 4, 10 and 11). The operative may start the machine by manipulation of said handle 164. Under normal circumstances the machine will have been stopped, as above referred to, when a cycle of operations of the tools carried by the turret 51 has been completed. Said stopping of the machine will occur after the turret slide 32 has retreated to a position in which the last indexing operation has been accomplished before stoppage of the machine. Assuming conditions at this point in the cycle, reference may now be had to Figure 10, which shows a section taken along the plane indicated by the arrows 10—10 of Figure 1. Under these conditions the turret slide is in the full retreated position. Located upon the tenon 140 which cooperates with the turret face presented toward the chuck is the neutral block 182. Said neutral block 182 has the function of stopping movement of the roller 153 toward the left as the parts are viewed in Figure 10. It will be recalled from the description appearing above that said roller 153, by reason of its cooperative relationship with the sliding member 157 and rocker arm 178, controls the shaft 179 and the rod 181. The parts are so proportioned and adjusted that when said roller 153 engages the neutral block 182, the rod 181 will be in its neutral position, stopping the pumping of fluid to the operating cylinder of the turret slide 32. This does not mean, however, that the fluid pump 37 is stopped, but merely that the fluid being pumped by said fluid pump is by-passed whereby the force thereof is not communicated to the operating cylinder 43 of the turret slide 32. The pressure within said fluid is effective at all times to communicate a turning movement to the shaft 179, and preferably the pressure exerted upon shaft 179 will be relatively low compared to the pressure adapted to be exerted within the operating cylinder 43 of the turret slide 32. By reason, however, of the engagement of roller 153 with the neutral block 182, turning movement of the shaft 179 is prevented. The operative, when he desires to restart movement of the turret slide, will swing the lever 164 in a clockwise direction as the parts are viewed in Figures 10 and 11, which will remove the plunger 162 from underlying relationship with the swinging lever 155, allowing the roller 153 to drop out of abutting relationship with the neutral block 182. Inasmuch as the pump 37 is at this time effective to exert a force tending to swing the shaft 179 in a counterclockwise direction as the parts are viewed in Figures 10 and 11, said shaft will, through the medium of the rocker arm 178, move the sliding member 157 toward the left as the parts are viewed in Figure 10. This rotation of the shaft 179 is of course accompanied by the controlling action of the pump to cause said pump to deliver the full quota of fluid to the operating cylinder of the turret slide 32 for rapid traverse movement. The sliding member 157 will remain in its extreme left position as the parts are viewed in Figure 10 until the beveled face 152 (Fig. 13) of the corresponding feed cam 141 engages roller 153 to cause movement of said sliding member toward the right. The parts will be so proportioned and adjusted that when the roller 153 is engaged by the surface 144 of a feed cam 141, the sliding member 157 will be in feed position, which means that the rocker arm 178, shaft 179 and rod 181 (see Figs. 5 and 10) will be in position to cause the control of the pump 37 to deliver a restricted quantity of fluid per unit of time to the operating cylinder 43 (Fig. 2) of the turret slide 32, which restricted amount of fluid is controlled by operation of the adjusting arm 176 (Fig. 5). The inner extremity of the plunger 162 and the bottom portion of the lever 155 have beveled surfaces adapted to cooperate with each other, whereby as soon as the operative releases his pull upon the handle 164, said plunger will tend to lift the lever 155. Ordinarily, the stroke of the sliding member 157 will not be sufficient to move the roller 153 to the left as the parts are viewed in Figure 10 a sufficient distance to clear the under side of the neutral block 182. However, whether or not the parts are so adjusted as to permit the roller 153 to clear said neutral block 182, no harm can result, inasmuch as the turning movement of the shaft 179 for moving the sliding member 157 to the right (Fig. 10) is not had until said neutral block has moved forwardly clear of the roller 153 and until the feed cam in rear of said neutral block has engaged said roller 153 to positively move the sliding member 157 to the right as the parts are viewed in Figure 10.

The instrumentalities for causing the automatic action of the turret slide, the indexing movements of the turret and the stoppage of movement by means of the neutral cam or neutral cams have been described above.

As indicated above, it is desirable that mechanism be provided whereby the operative may at his option discontinue the automatic control and assume manual control, as for example when he is setting up his work and adjusting his tools for cooperation with said work.

Referring now to Figures 1, 3, 5 and 9, it will be noted that the shaft 179 (which controls the pump 37) has secured thereto the handle 183. As said shaft 179 rotates, said handle 183 will swing back and forth, but performs no functions while the machine is being controlled automatically. Pivotally connected to the handle 183 is the handle 184. From an inspection of Figure 1 it will be clear that said handle 184 is pivotally mounted intermediate of its length to swing about the axis of the pin 185, which pin is carried by a boss or bosses forming part of the handle 183. The lower extremity of the handle 184 is provided with the yoke 186 (Fig. 5), which yoke carries a pair of opposed blocks 187 adapted to ride in a circumferential slot 188 in a collar 189 having a rotating bearing relationship with the shaft 179. Said collar 189 is part of the arm 190. It will be clear that as the handle 184 is swung about the axis of the pin 185, the arm 190 will be given a movement of reciprocation axially of the shaft 179. By reference to Figure 9 it will be noted that said arm 190 has secured thereto the valve rod 191 cooperating with the valve 192. Figure 9 shows a horizontal sectional view of the valve 192, and Figure 9a shows a vertical sectional view, both of said sectional views being taken through the axis of the valve rod 191. The valve rod 191 controls the valve plunger 193, which valve plunger is adapted to have a movement of reciprocation within the bore 194. Said valve plunger 193 is provided with the three spaced cylindrical portions 195, 196 and 197 and the intervening annular recesses 198 and 199. Said valve plunger 193 controls communication between the spaced ports 200 and 201. By reference to Figure 9a it will be noted that the valve 192 is provided with the ports 202 and 203. Extending longitudinally of the valve 191 is the aperture 204, which communicates with the bore 194 through the cross apertures 205, 206 and 207. The aperture 204 has access to a drain through the port 208.

The connections to the various ports referred to will be described briefly hereinafter. At the present time it may be stated that when the arm 190 is in its right-hand position as shown in full lines in Figure 9 (which is the automatic operating position), access is provided between ports 203 and 201. Access is also provided between ports 202 and 200. Access through the port 208 is cut off at this time. When the operative desires to assume manual control of the movement of the turret slide 32, he will swing the handle 184 in a clockwise direction as the parts are viewed in Figure 1, which will move the arm 190 to the left as the parts are viewed in Figures 1 and 9. The position of the bracket 190 for manual control is indicated in Figure 9 in dotted lines. Under these conditions the portions 197 and 196 of the valve plunger 193 are positioned in obstructing relationship with ports 203 and 202, respectively, closing said ports. At this time also ports 200 and 201 communicate with the annular recess 199, which recess also communicates with the cross bore 206, providing communication to the elongated aperture 204, which through port 208 permits access to the drain. Under these conditions the operative is not opposed by a static pressure of fluid (as will be explained further hereinafter), and he may, by operation of the handles 184 and 183, turn the shaft 179 to the position he desires for the manual control of the pump 37; that is to say, if he desires to stop operations he may with a quick movement turn the shaft 179 to neutral position, wherein the pump 37 will have its connections so changed that it will no longer deliver fluid under pressure to the operating cylinder 43 of the turret slide 32; or, if the operative desires, he may turn the shaft 179 to reverse position for reversing the turret slide 32. A valuable feature of this construction is that the operative may with a quick movement assume control at any time regardless of the stage of the cycle. If the operative should notice that one of his tools was not properly adjusted, or that the work was not positioned properly in the chuck he could stop the mechanism almost instantaneously, or could with equal facility reverse operations.

The hydraulic controls for the mechanisms above described will now be referred to. As indicated above, the pump 37 is the source of pressure of the fluid for controlling the operation of the cylinder 43 for operating the turret slide 32 and the controlling of the clamping member 129. The control of said pump 37 and the operativeness of said pump for performing the functions of the above described instrumentalities is had through a plurality of pipe connections. Figure 15 shows a layout of the pipe connections referred to. Referring first to said Figure 15, it will be noted that the pump 37 has cooperatively associated therewith the valve 209, which valve is provided with a plunger (not shown) controlled by the valve rod 181. As clearly shown in Figures 1, 5, 9, 10 and 11, said valve rod 181 is connected to move with the shaft 179. The details of the valve 209 are not illustrated herein, inasmuch as they do not form any part of the present invention, pumps and control valves therefor being readily purchasable in the open market. Such pumps and control valves (which are readily available in the open market) have the function, as above referred to, of delivering pressure selectably for rapid traverse movement or feeding movement and for controlling the speed of the feeding movement as well as the direction of said rapid traverse movement and said feeding movement. Valves and pumps are readily purchasable in the open market which are provided with control means for by-passing the fluid moved by said pump, whereby pumping motion has no effect in communicating power to any selectable instrumentalities controlled by said pump. Expressed in other language, a pump 37 and a control valve 209 may be readily purchased in the open market which will deliver fluid to the operating cylinder 43 for communicating to the piston of said cylinder a rapid traverse movement in either direction and feeding movement in either direction, which will control the amount of fluid pumped per unit of time to control the speed of said feeding movement and which will by-pass (at the option of the operative) the pumped fluid around the operating cylinder 43, while permitting the action of the fluid under pressure upon the plunger of said valve 209. The various actions referred to are accomplished by operation of the plunger within the valve 209, which plunger is connected to the rod 181. Figure 5 shows five selectable positions of the rod 181 and consequently of the plunger within the valve 209. Said five selectable positions are the following (see Fig. 5): 209a, which is the position for rapid traverse forward movement of the turret slide 32; 209b, which is the position for feeding forward movement of the turret slide 32, the speed of said feeding movement being controllable by operation of the lever 176; 209c, which is the neutral position, that is— the position in which the fluid pressure is by-passed around the operating cylinder 43; 209d, which is the position for feeding retreating movement, the speed of which retreating movement may be controlled by adjustment of the lever 176; and 209e, which is the position for rapid traverse retreating movement of the turret slide 32. The control means purchasable in the open market also includes the operating cylinder 210 having a piston connected to the plunger of the valve 209. Said control mechanism purchasable in the open market therefore provides hydraulic means for controlling said valve 209.

As noted above, the numeral 48 indicates a control valve. Said control valve 48 contains a plunger adapted to be moved by the valve plunger 48c, which plunger extends outwardly from the control valve 48 from each end thereof. Said valve plunger 48c is adapted to be abutted selectably by a pair of brackets 212—212, which brackets 212—212 are adjustably carried by the rod 213. Said rod 213 is secured to the bracket 46, which bracket (see Fig. 2) is fast to the turret slide 32. The parts are so proportioned and adjusted that as the turret slide 32 moves in its travel longitudinally of the turret lathe, the brackets 212—212 will selectably engage the valve plunger 48c to operate the control valve 48.

The numeral 214 indicates a turret clamping valve, which will be referred to presently, the function of said valve being to admit fluid under pressure to the clamping means for the turret 51 after said turret has been indexed and to release the pressure upon said fluid immediately prior to the time that the turret 51 is to be indexed. The clamping means for the turret 51 is illustrated in Figure 14, in which the cylinder 126 in cooperation with the piston 125 and piston rod 123 is adapted to perform clamping functions.

Referring now to the pipe connections between the pump 37 and the other portions of the turret lathe, reference may again be had particularly to Figure 15. It will be noted that the valve 209 is connected to the left-hand end of the operating cylinder 43 by means of the pipe line 215. Said valve 209 is connected to the right-hand end of the operating cylinder 43 through the pipe line 216. The numeral 217 indicates a pipe line which may be termed a return line, a drain, or a leakage line. The numeral 218 indicates a pipe line which is adapted to carry fluid to the control valve 48. The pressure within pipe line 218 is relatively low compared to the pressure within pipe line 215 or 216, which pipe lines 215 and 216 convey pressure to the operating cylinder 43. Leading from the control valve 48 are the two pipe lines 219 and 220, of which pipe line 219 connects with port 203 and pipe line 220 connects with port 202 of valve 192 (see Fig. 9A). Communication is had between pipe line 218 and pipe line 219 when the right-hand bracket (Fig. 15) has moved the valve plunger 48c to the left as the parts are viewed in Figure 15, which is to say, when the turret slide is in its forward position. Communication is had between pipe line 218 and pipe line 220 when the left-hand bracket 212 (Fig. 15) has moved the valve plunger 48c toward the right, which is to say, when the turret slide is in its full retreated position. By reference to Figures 9A and 15 it will be clear that the drain from port 208 is connected through the pipe line 221 to the pipe line 217. Ports 200 and 201 are connected, through pipe lines 222 and 223, respectively, to the two sides of the piston within the cylinder 210 (Figs. 9 and 15). As indicated above, the connections of the ports communicating with pipe lines 219, 220, 221, 222 and 223 are controlled by movement of the arm 190, which is responsive to the operation of the handle 184 (Fig. 1). It will be noted that the valve 48 is connected through the T connection 224 to the pipe line 217. Said T connection 224 is connected to the two sides of the piston within the valve 48 and allows drainage back to the pump 37.

The valve 214 which controls the clamping action of the cylinder 126 and the connections to said valve 214 will now be described. It will be noted from an inspection of Figure 15 that the valve 214 has a bore 225 for receiving the plunger 226. Said plunger 226 is adapted to be operated by the abutment 227 adjustably carried by the rod 213 (Figs. 2 and 15). Said valve 214 is provided with the inlet port 228 and is provided with the outlet port 229. A drain port 230 is also provided. The numeral 231 indicates a return port. The plunger 226 is provided with the relatively large cylindrical portions 232 and 233, which enlarged portions have disposed between them the annular recess 234. On the upper side of the large portion 232 is the annular recess 235. The numeral 236 indicates a bore communicating with the annular recess 235 at one extremity and the port 230 at its other extremity. A spring 237 biases the plunger 226 in its uppermost position. The abutment 227 is adapted to move and hold the plunger 226 in its lowermost position during the advancing movement of the rod 213; that is to say, during the advancing movement of the turret slide 32 controlled by the operating cylinder 43. The inlet port 228 is connected to the right-hand end of the cylinder 43 through the pipe line 238, whereby fluid under pressure will be admitted to the port 228 simultaneously with the admission of pressure to the cylinder 43 for communicating advancing movement to the turret slide. The port 231 is connected to the relief side of the clamping cylinder 126 through the pipe line 239. By reference to Figure 14 it will be noted that said pipe line 239 is connected to the port 132, which communicates with the space above the stationarily mounted piston 125. Port 229 is connected to the clamping cylinder 126 through the pipe line 240. By reference to Figure 14 it will be noted that pipe line 240 is connected to the space on the under side of the stationarily mounted piston 125. The port 230 is connected through the pipe line 241 to the drain line 217.

Figure 15 shows the parts when the turret slide is in retreated position, at which time port 228 is closed by the enlarged portion 233 of the valve plunger 226. At this time pressure on the upper side of the piston 125 in the clamping cylinder 126 (Fig. 14) is relieved through the pipe line 239, annular recess 235, bore 236 and pipe line 241, which communicates with the drain line 217. At this time also pressure is relieved from the under side of the piston 125 (Fig. 14) through the pipe line 240, space below the enlarged portion 233 of the plunger 226 and pipe line 241, which communicates with the drain line 217.

The directions of fluid pressure within the control circuits illustrated in Figure 15 are indicated by arrows accompanied by certain significant letters, as follows:

Arrow CC indicates the direction of pressure within the pipe line 218, which, as indicated above, is always in one direction. There is always pressure in said pipe line as long as the pump 37 is operating.

Arrows CCF and CCR indicate directions of fluid flow in the control circuits controlled by the valve 48, which control circuits operate the piston in the cylinder 210 to control valve 209 to control the direction of piston movement within the operating cylinder 43.

Arrows TSF and TSR indicate fluid flow to and from the operating cylinder 43 for forward movement and retreating movement, respectively, of the turret slide.

Arrow CL indicates the direction of fluid pressure for exerting clamping action on the clamping cylinder 126. In the embodiment of the clamping mechanism illustrated in Figure 14 there is little, if any, flow of fluid within the pipe line 240. Inasmuch, however, as leakage past the piston 125 may occur in service, a certain amount of fluid may flow out through the pipe line 239 and pipe line 241 to drain pipe 217.

Arrow CLD indicates the direction of flow of leakage fluid, if any, from the clamping cylinder 126.

Arrow D indicates the direction of flow of leakage fluid.

Certain modifications of the instrumentalities above described will now be referred to. Though the structure to be described in Figures 16, 17, 18, 19, 20, 21 and 22, inclusive, is referred to as covering modifications, such structure will doubtless in many instances be preferred to that illustrated in Figures 1 to 15, inclusive. Whether the man skilled in the art will prefer the structure illustrated in Figures 1 to 15, inclusive, or the structures in Figures 16 to 22, inclusive, will depend upon his personal taste as well as the exigencies of the situation which confronts him.

Referring now to Figures 16 and 17, a structure is disclosed which may be preferred by many for clamping the turret 51 in indexed position. The turret slide 32 is illustrated as provided with the upstanding stud 242, which stud is preferably non-rotatably carried by said turret slide 32. Upward movement of the stud 242 relative to the turret slide 32 is limited by the nut 243, which may be non-rotatably secured to the stud 242 by means of setscrews 244—244. Intermediate its length, the stud 242 is provided with the bearing surface 245, which has the conformation of a frustum of a cone. Co-operating with the bearing surface 245 is the bushing 116, which bushing may be similar to that disclosed in Figure 14 having the gear teeth 117 adapted to mesh with the bevel gear 118, which is fast to the shaft 119. The bushing 116 engages the seat 246 in the turret 51. The upper extremity of the stud 242 is threaded for the reception of the nut 247, which through the medium of the washer 248 limits downward movement of the stud 242 relative to the turret 51.

The turret slide 32 is provided with the upstanding portion 249, providing the annular shoulder 250. The upstanding portion 249 provides a broad bearing for receiving the turret 51. Adjacent to the annular shoulder 250 of the upstanding portion 249 is the annular shoulder 251 forming part of the turret 51.

As clearly appears from an inspection of Figure 16, said shouldered portions 250 and 251 are complementary to each other. The shoulder 251 forming part of the turret 51 has the conformation on its upper surface of the frustum of a cone. Disposed in clamping relationship with the shoulders 250 and 251 is the clamping member indicated as a whole by the numeral 252. Said clamping member 252, as shown in Figure 17, preferably takes the form of a C-clamp having the two halves 253 and 254 hinged together to swing about the axis of the pin 255. Said pin 255 is preferably fast to the turret slide 32.

The swinging extremity of the half 253 of the C-clamp 252 is provided with a cylinder portion 256 having the cylinder head 257. Communication is had from the pipe line 239 through the cylinder head 257 to the interior of the cylinder 256. Slidably disposed within the cylinder 256 is the piston 258 having the rod 259 extending from one side thereof. The numeral 260 indicates a cylinder head at the opposite end of the cylinder 256 from the cylinder head 257. Said cylinder head 260 is apertured to permit the passage of the rod 259, a packing gland 261 being provided, which packing gland is held in place by means of the nut 262, whereby to make the cylinder 256 fluid-tight. The pipe line 240 communicates with the cylinder 256 on the opposite side of the piston 258 from that having communication with the pipe line 239. The swinging extremity of the half 254 of the C-clamp 252 is provided with the shouldered portion 263 apertured to permit passage of the rod 259. The extremity of the rod 259 is threaded and is provided with the nut 264, which cooperates with the washer 265 for providing abutting relationship with the shouldered portion 263 of the half 254 of the C-clamp 252. The aperture within the shouldered portion 263 is shouldered, as indicated by the numeral 266, which shoulder provides an abutment for one extremity of the spring 267, the other extremity of which bears against the nut 262. The spring 267 has a tendency to separate the two halves 253 and 254 of the C-clamp 252. When fluid pressure is applied through the pipe line 240, the piston 258 will be urged toward the cylinder head 257, tending to enlarge the space between the piston 258 and the cylinder head 260. The net result of this action will be to cause a clamping action of the C-clamp 252 to hold the turret 51 in rigid relationship with the turret slide 32. When pressure is released upon the fluid within the pipe line 240, the spring 267 will urge the C-clamp 252 to non-clamping relationship with the shouldered portions 250 and 251, allowing the turret to be rotated about its axis in indexing movement. In the clamping arrangement disclosed in Figures 16 and 17 there will be a small amount of fluid flow within the pipe lines 239 and 240 even in the absence of any leakage past the piston 258.

Figures 18, 19 and 20 illustrate another arrangement for clamping the turret 51, which arrangement may be preferred by many of those skilled in the art. By reference to Figure 18 it will be noted that a sleeve 268 is provided which may have an exterior contour identical with the stud 242 disclosed in connection with Figures 16 and 17. Said sleeve 268 is non-rotatably carried by the turret slide 32 and is provided with the nut 247, which through the medium of the washer 248 exerts pressure downwardly upon the turret 51 for limiting downward movement of the sleeve 268. As in the structure disclosed in Figures 16 and 17, the sleeve 268 is provided with the conical bearing surface 245 cooperating with the bushing 116. In the structure shown in Figure 18, the sleeve 268 houses the upstanding pin 269, which pin 269 is screw-threaded at its upper extremity for the reception of a nut 270 and the lock nut 271. Said nut 270 has abutting relationship with a plate 272 adapted to engage flatwise against the upper surface 273 of the interior of the turret 51. It will be noted that said upper surface 273, as well as the under surface of the plate 272, provides a recess 274 within which are housed the nut 247 and washer 248. The lower extremity of the pin 269 is provided with the pair of flats 275—275 for receiving the bifurcated lever 276. It will be noted from an inspection of Figure 20 that said bifurcated lever 276 straddles the lower extremity of the pin 269, being adapted to swing about the axis of the pin 277. The bifurcations of said lever 276 are indicated by the numerals 278—278. Said bifurcations provide cam surfaces adapted to have abutting relationship with the lower extremity of the sleeve 268. Said two bifurcations 278—278 are similar in outline and have the high portions 279 adapted to grip the lower extremity of the sleeve 268. Figure 18 shows the bifurcated lever 276 in position wherein the high portion 279 of each bifurcation 278 is in abutting relationship with the lower extremity of said sleeve 268, such position of the lever 276 being indicated in full lines. Figure 18 shows in dotted lines two other positions of the bifurcated lever 273, said other positions being indicated by the numerals 276A and 276B. When the lever 276 is in its full line position (Fig. 18), in which the high portions 279—279 of said lever 276 engage the lower extremity of the sleeve 268, the pin 269 is pulled downwardly relative to the sleeve 268 and the plate 272 is held in clamping relationship with the surface 273 of the turret 51. When the bifurcated lever 276 is in its dotted line position 276A (Fig. 18), said pin 269 is released and the clamping relationship between the plate 272 and the surface 273 of the turret 51 is relieved.

The means for controlling the position of the bifurcated lever 276 includes the spring-pressed plunger 280, which plunger is in position to abut said lever 276 as the turret slide is moved in its forward and retreating movements. Said plunger 280 is mounted in a bushing 281 carried by the index plate 84, above referred to, which index plate, as mentioned above, is adjustably carried by the bed 30 of the lathe. A spring 282 normally urges the plunger upwardly, upward movement of said plunger being limited by means of the cross pin 283. As indicated above, the plunger 280 is disposed in position to be engaged by the lever 276 in the forward and retreating movements of the turret slide 32. The parts are indicated in position wherein the turret 51 is clamped to the turret slide 32. This is the position during the forward movement of the turret slide and in the retreating movement up to a position just prior to that at which indexing of the turret 51 is to be accomplished. As the turret slide moves in its retreating direction, that is—toward the right as the parts are viewed in Figure 18, the extremity of the lever 276 will engage the side of the plunger 280 and said lever 276 will be moved in a clockwise direction relative to the axis of the pin 277, releasing the gripping relationship between the high parts 279—279 of the lever 276 from abutting relationship with the lower extremity of the sleeve 268. This leaves the turret 51 free to be indexed. The lever 276 is loosely mounted upon the pin 277, and after the lever 276 has passed the plunger 280, said lever 276 will assume a position relative to the pin 277 substantially like that indicated by the numeral 276A in Figure 18; that is, the weight of the lever 276 will hold said lever 276 in a position with the high parts 279—279 of said lever resting lightly against the lower extremity of the sleeve 268. As the turret slide moves in its forward direction, that is—toward the left as the parts are viewed in Figure 18, said lever 276 will engage the right side of the plunger 280, swinging said lever 276 in a counter-clockwise direction from the position indicated by the numeral 276A. Inasmuch as the lever 276 in its position indicated by the numeral 276A had the high parts 279—279 resting lightly against the lower extremity of the sleeve 268, the counter-clockwise action referred to will inaugurate a gripping relationship between said high parts 279—279 and the lower extremity of the sleeve 268. As the turret slide 32 continues toward the left as the parts are viewed in Figure 18, the lever 276 will exert a downward pressure upon the plunger 280. A position of the lever 276 overlying the plunger 280 is indicated by the numeral 276B. At this time the plunger 280 has been depressed to the limit of its downward movement. Said limit will be so chosen that the lever 276 will have swung sufficiently far in a counter-clockwise direction to effect a tight engagement between the high parts 279—279 of said lever and the lower extremity of the sleeve 276. The downward limit of the plunger 280 is defined by the annular head portion 284 of the plunger 280 and the upper surface 285 with which said annular shoulder engages. If preferred, the bushing 281 could be omitted, but in any event the engaging surface 285, whether said surface is on the bushing 281 or upon the upper part of the index plate 84, should be finished accurately to a predetermined level, whereby the lowermost position of the plunger 280 may be accurately predetermined. After the lever 276 has passed over the plunger 280, the spring 282 will move said plunger to the upper limit of its movement, whereby said plunger will be operative to engage lever 276 upon the next succeeding retreating movement of the turret slide 32. Due to the camming action of the high parts 279—279 of the lever 276, said lever 276 will remain in its clamping position throughout the forward movement of the turret and throughout the retreating movement of the turret back to the region at which the lever again strikes the left side of the plunger 280 for releasing said lever 276.

Figure 21:
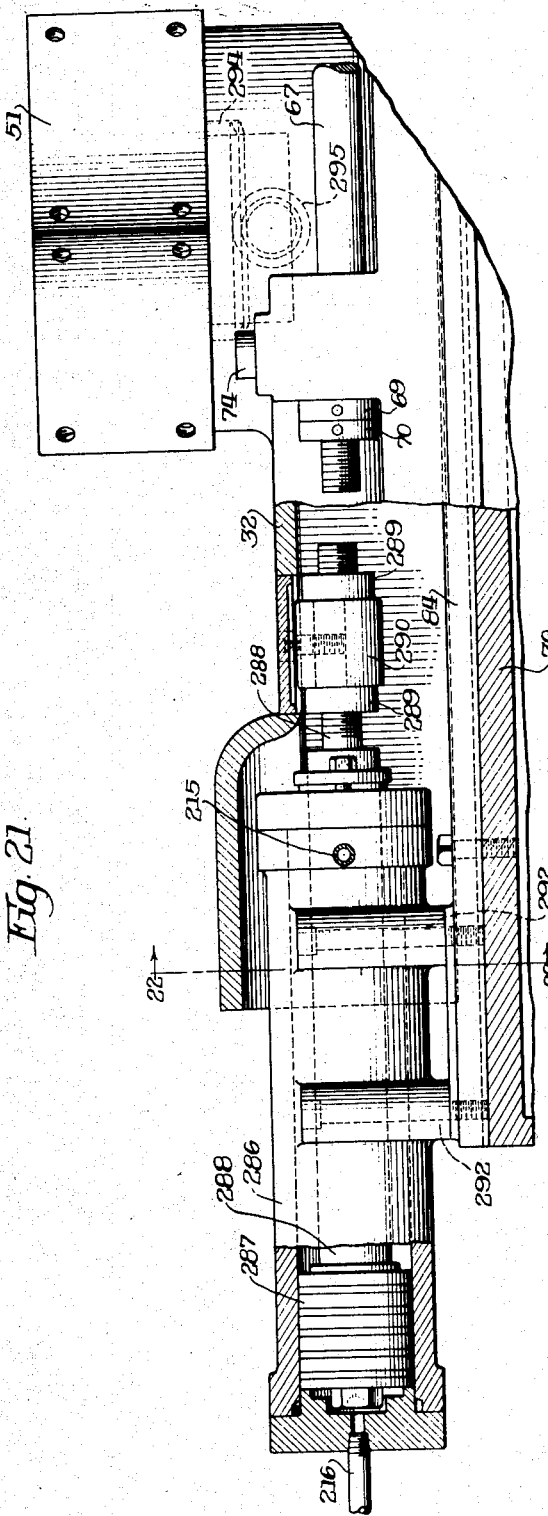
Figure 21 represents a modified construction which may be used in place of part of the structures shown in Figures 2, 3 and 4, said Figure 21 illustrating, along a vertical plane disposed symmetrically of the machine, a modified arrangement of operating cylinder relative to the turret slide.
Figure 22:
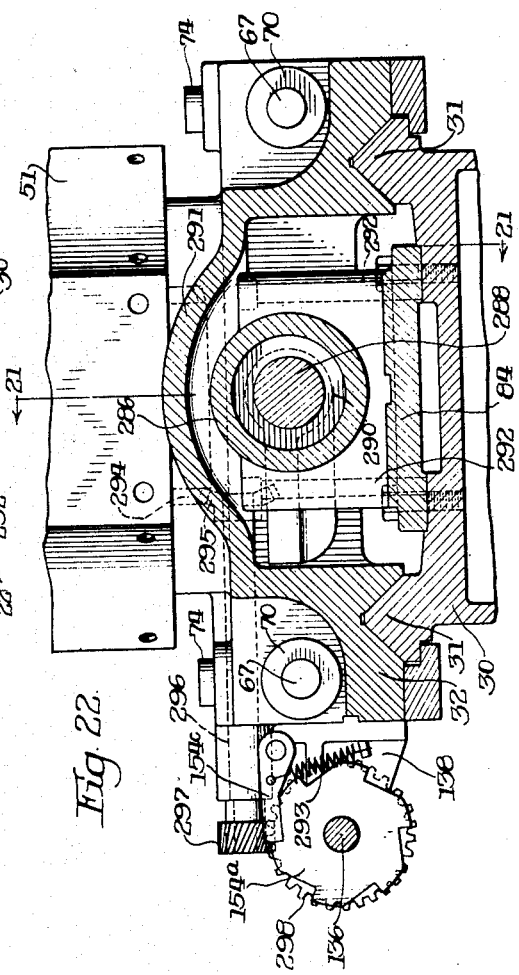
Figure 22 is a section taken in the direction of the arrows 22—22 in Figure 21.

Figures 21 and 22 indicate another arrangement of the operating cylinder with the turret slide. The structure shown in Figures 21 and 22 has the decided advantage that the line of action of the operating cylinder is symmetrically disposed relative to the turret slide, and in many instances will be preferred over the arrangement of the operating cylinder 43 shown in Figure 3.

Disposed symmetrically with the turret lathe, that is—symmetrically with the turret slide 32, is the operating cylinder 286, which operating cylinder is provided with the piston 287 having connected thereto the piston rod 288. Said piston rod 288 is screw-threaded at its forward extremity for the reception of a pair of adjustable nuts 289—289 adapted to cooperate with a downwardly extending lug 290 secured to the under surface of the turret slide 32. It will be clear from an inspection of Figure 22 that the upper wall of the turret slide 32 is arched, as indicated by the numeral 291, to provide space for the operating cylinder 286. Said operating cylinder is provided with the base portions 292, which base portions are carried by the index plate 84, which index plate, as noted above, is adjustably secured to the bed 30.

The relationship between the piston rod 288 and the turret slide 32 will not ordinarily require adjustment after initial adjustment at the plant where the lathe is manufactured. Adjustment of the turret slide 32 relative to the bed 30 may be readily accomplished by adjustment of the index plate 84 relative to said bed 30.

As indicated above, the axis of the piston rod 288 is symmetrically disposed relative to the turret slide 32. Expressed in other language, the axis of the piston rod 288 is in the medial vertical plane of the turret slide 32, which is to say that the axis of the piston rod 288 is in the same vertical plane as the axis of rotation of the turret 51. Expressed in still other language, the axis of the piston rod 288 is in the same vertical plane as the axis of rotation of the chuck which holds the work to be operated upon. By reason of this arrangement, the line of force set up by the operating cylinder 286 is as close as practicable to the axis of rotation of the chuck which holds the work to be operated upon.

Figure 22 shows the ratchet plate 154a, which, as described above in connection with Figure 4, has the function of positively locating the cam drum in position for each station of the turret 51. Figure 22 shows a slightly different arrangement of the spring from that shown in Figure 4, a tension spring 293 being utilized for biasing the pawl 154c into engaging relationship with the ratchet plate 154a. The drive connection between the turret 51 and the reduced extremity 136 of the cam drum 137 is quite simple in the structure shown in Figures 21 and 22. According to the disclosure of Figure 22, the turret 51 has a bevel ring gear 294 depending therefrom, which bevel ring gear is disposed coaxially with the turret 51. Said bevel ring gear 294 meshes with the bevel pinion 295, which is secured to the shaft 296. Said shaft 296 is provided at its other extremity with the helical pinion 297, which helical pinion meshes with the helical gear 298 fast to the reduced extremity 136 of the cam drum 137. The drive connection illustrated in Figure 22 has the advantage over that shown in Figures 1 to 15 inclusive (shown more particularly in Figs. 3 and 4), in that the drive connection is shorter and more direct, being connected at the forward extremity of the cam drum 137 rather than at the rear extremity as in Figures 3 and 4.

A mode of operation of the above described embodiments of the present invention is substantially as follows:

The description may start at a point at which the motor 35 is operating to rotate the chuck 34 and operating the fluid pump 37. Conditions may be assumed with the turret slide 32 in its retreated position after said turret 51 has been indexed and movement of the turret slide 32 has been stopped, automatically or otherwise, as for example after the completion of a cycle of operations upon a piece of work in the chuck 34.

After the operative has removed the piece of work from the chuck 34 and has inserted a new piece of work to be operated upon, he will inaugurate operations by momentarily pulling outwardly and releasing the handle 164 (Figs. 1, 10 and 11). By reference to Figure 10 it will be noted that this operation removes the pin 162 from underlying relationship with the lever 155, allowing the roller 153 to drop out of abutting relationship with the stop block 182. As indicated above, the pump 37, being operated by the motor 35, exerts a fluid pressure against the sliding member 157 (Fig. 10), pressure being communicated through pipe line 218 (see Fig. 15), valve 48, pipe line 220, valve 192 and pipe line 222 to the piston within the cylinder 210 to the rod 181. Referring to Figure 5, it will be noted that the rod 181 is connected through the link 180a to the lever 180. Referring to Figure 10, it will be noted that the lever 180 is connected to the shaft 179. Again referring to Figure 10, it will be noted that the rod 179 operates the lever 178, which has its extremity seated within the notch 177 in the sliding member 157. Roller 153 having been released from the stop block 182, the fluid pressure referred to will cause said sliding member 157 to move toward the left as the parts are viewed in Figure 10, the movement of the sliding member 157 being limited according to the limits of the piston travel within the cylinder 210. The plunger within the valve 209 is now in the position indicated by the numeral 209a in Figure 5. Movement of the piston within the cylinder 210 has caused movement of the plunger within the valve 209, admitting fluid under pressure to the pipe line 216 (Fig. 15). Said fluid under pressure is communicated to the operating cylinder 43 (Fig. 15) or 286 (Fig. 21), causing the forward rapid traverse movement of the turret slide 32. Referring now to Figures 12, 13 and 13A, it will be noted that the beveled surface 152 of one of the cam blocks 141 will engage roller 153, which roller has now been lifted to its uppermost position by reason of the spring 163 (Fig. 10). Said beveled surface 152 will cause movement of roller 153 and consequently the sliding member 157 to the right as the parts are viewed in Figure 10, which motion will be communicated to the lever 178, shaft 179, rod 181 to the plunger within the valve 209 (Fig. 5), moving the plunger to the position indicated by the numeral 209b, which is the position for feeding movement forward of the turret slide 32. Inasmuch as the pressure within the pipe line 218 and pipe lines 220 and 222 is relatively low compared to the pressure within the pipe lines 215 and 216, the plunger within the cylinder 210 will be moved in opposition to the pressure within said pipe lines 218, 220 and 222. The relatively low pressure within pipe lines 218, 220 and 222 will insure engagement of roller 153 with the surface 144 of the cam block 141. It will be understood that the cam blocks 141 will be so located upon the drum 137 that the movement from 209a to 209b (Fig. 5), changing from rapid traverse forward movement to feeding forward movement, will occur shortly prior to the engagement of the corresponding tool in the turret 51 with the work to be operated upon. The cam block 141 will continue its forward movement in engagement with the roller 153, the surface 144 of said cam block 141 defining the position of said roller 153. As explained above, changes in the length of rapid traverse movement may be made by adjusting the position of the corresponding cam block 141 longitudinally of the drum 137. At the same time that or just prior to the time at which the surface 144 of the cam block 141 defines the position of the roller 153, the beveled surface 151 of the cam plate 145 engages roller 154 (Fig. 11). Said cam plate, it will be remembered, is adjustable (as clearly shown in Fig. 13) whereby the extent to which said cam plate 145 will move roller 154 may be predetermined. By reason of this construction the speed of the feeding movement is controllable. This control is accomplished through structure illustrated in Figures 5 and 11. Referring first to Figure 11, it will be noted that the roller 154 is mounted upon the sliding member 169, which controls movement of the lever 171. Said lever 171 is fast to the shaft 173, which through the lever 174 and adjustable strut 175 controls the adjusting arm 176 of the pump 37. By adjusting the position of the cam plate 145, therefore, the quantity of fluid pumped per unit of time during the forward feeding movement of the turret slide may be predetermined. It will be understood, of course, that the surface 151a of the cam plate 145 which defines the position of the roller 154 can be designed as preferred. For example, if it should be desired to vary the speed of the feeding movement during a stroke, the surface 151a, instead of being a straight line, could be made irregular to correspond with the various feeding speeds desired. The forward movement of the turret slide 32 may or may not (at the option of the operative) be accompanied by movement of either or both of the cross slides 52. Whether or not either or both of said cross slides shall have motion communicated thereto in the longitudinal movement of the turret slide for any particular station of the turret 51 depends upon the shoes 79 and 80. Each of said cross slides 52—52 is connected to be operated transversely in response to the corresponding cam plate 56, each of which cam plates is secured to a corresponding longitudinally extending rod 67. As explained above, each of said rods has a flat portion 71 and shoulders 72 at the forward extremities of said flat portions. Nuts 69 are provided at the rear extremities of said flat portions. If the operative desires to have a movement of either cross slide 52 during the longitudinal movement of the turret at any station, he will mount a shoe 79 or 80 in position to depress the pin 73 cooperating with the particular slide 52 which he desires to move. It will be clear without detailed explanation that when a shoe 79 or 80 is in overlying relationship with the sleeve 74 housing either pin 73, said pin will be in position to operate the corresponding rod 67 to move the corresponding cross slide as the turret slide 32 moves in a longitudinal direction. According to the illustrated arrangement of the cams 57—57 cooperating with the cross slides 52—52, said cross slides 52—52 will be moved toward the vertical medial plane of the lathe as the turret 51 is moved forwardly. Conversely, said cross slides 52 will be moved outwardly in unison with the retreating movement of the turret 51, it being assumed, in either instance, that a shoe 79 or 80 has been mounted in position to cause the pin 73 to cooperate with a corresponding rod 67. As has been explained hereinabove, the axis of one of the pins 73 is disposed at a different radial distance from the axis of rotation of the turret 51 than is the axis of the other pin 73, and, correspondingly, the shoe 79 is disposed at a different radial distance from the axis of rotation of the turret 51 than is the shoe 80. Accordingly, each shoe will cooperate only with one of the pins 73.

The limit of the forward movement of the turret slide 32 is predetermined according to the position of the right-hand bracket 212 (Fig. 15), which moves in unison with the bracket 46 connected to the turret slide 32. Said right-hand bracket 212 will be so adjusted that when the turret slide has reached the point in its forward feeding movement at which reversal is desired, said bracket 212 will operate the plunger 48c of the valve 48. This action will cause the communication of fluid pressure from pipe line 218, through pipe line 219, to valve 192 and pipe line 223 to the cylinder 210. This fluid pressure will cause movement of the plunger within valve 209 to the position 209e, which is the rapid traverse position for retreating movement of the turret slide 32. The pump 37 will now deliver fluid under pressure to the pipe line 215, communicating with the left-hand end of the operating cylinder 43 as the parts are viewed in Figure 15. This action will cause the rapid retreat of the turret slide 32, which turret slide is connected to the plunger of said cooperating cylinder 43. For most work it will not be necessary to provide a feeding movement in a reverse direction. However, the present invention contemplates a structure in which the feeding movement in the reverse direction may be had if and when desired. For this feeding speed in the retreating movement, cam blocks and cam plates would be provided for positioning the plunger of valve 209 in position 209d and for correspondingly positioning the adjusting arm 176 of the pump 37. Such cam blocks have not been illustrated in the drawings, inasmuch as their illustration is not necessary in explaining the present invention. In some classes of work it is essential that the limit of forward movement of the turret slide 32 be accurately adjusted, and furthermore that the turret slide be held stationary at the limit of its forward movement for a sufficient length of time to allow the chuck holding the work to be operated upon to complete one or more revolutions. This precise adjustment is possible according to the present invention and constitutes a valuable feature of the present invention. In order to provide the precise adjustment referred to, the parts are so proportioned and adjusted that the piston in the operating cylinder 43 (Figs. 1 to 15, inclusive,) or the operating cylinder 286 (Figs. 21 and 22) comes to the end of its stroke in a forward direction at the precise instant when forward movement of the turret slide 32 should be stopped. In order to provide this adjustment in the structures shown in Figures 1 to 15, inclusive, the index plate 84 will be adjusted relative to the bed 30 and the piston rod 44 will be adjusted by manipulation of the nuts 47— 47 (Fig. 2), whereby the relation between the piston within the cylinder 43 is adjusted relative to the turret slide 32. In the structures shown in Figures 21 and 22 the adjustment referred to is had by adjustment of the index plate 84 relative to the bed 30. In order to hold the turret slide 32 at the limit of its forward movement for a sufficient time to permit the chuck 34 to make one or more revolutions while the turret slide is stationary, the right-hand bracket 212 (Fig. 15) will be so positioned that it will, when the piston in cylinder 43 (or cylinder 286) is at the forward limit of its stroke, be in position to hold the plunger 48c of valve 48 in an intermediate position, only slightly opening the port controlling communication between pipe line 218 and pipe line 219. It will be remembered that the pressure within pipe line 218 is relatively low. By reason of this fact, and by reason of the restricted communication between pipe line 218 and pipe line 219, the time element will become important, and the reversing action of the plunger within cylinder 210 will be sufficiently delayed to permit one or more revolutions of the chuck 34 before said plunger has been operated sufficiently to cause communication between the pump 37 and pipe line 215 to cause rearward movement of the piston within the operating cylinder 43 (or operating cylinder 286). In certain practical embodiments of the present invention which have gone into commercial service, the time element referred to may be varied within wide limits by adjustment of the right-hand bracket 212 (Fig. 15), which adjustment controls the restriction of the communication through valve 48 between the pipe line 218 and the pipe line 219. After the turret slide 32, which carries the bracket 46, has advanced a predetermined distance, the member 227 will engage the plunger of valve 214, opening communication between the pipe lines 238 and 240, app'y-ing clamping action of the clamping cylinder 126 (Fig. 14) or the C-clamp 252 (Figs. 16 and 17). During the forward movement of the turret slide 32 after the turret 51 has been indexed, the locking bolt 86 will be in its uppermost position, which means that the roller 97 will be in its lowermost position. As the turret slide 32 advances, said roller 97 will engage the trip 91. Said trip 91, being pivotally mounted, will swing in a counter-clockwise direction as the parts are viewed in Figures 14 and 14A, whereby no interference occurs between said trip 91 and roller 97.

When the turret slide 32 has reached a position adjacent to its extreme retreated position, the turret 51 is indexed and the cam drum 137, being connected with said turret 51, is given a corresponding movement of rotation about its axis. Before indexing can be accomplished, the turret 51 must be unclamped and the locking bolt 86 (Figs. 14 and 14A) must be withdrawn from the turret 51. During the forward movement of the turret slide, the member 227 has held the plunger of the valve 214 (Fig. 15) in its innermost position, allowing fluid under pressure to exert its force upon the clamping cylinder 126 (Fig. 14) or the C-clamp 252 (Figs. 16 and 17). When the turret has retreated to a predetermined position, the engaging relationship between the member 227 and the plunger of valve 214 is discontinued and the pipe line 238, which communicates pressure to said clamping means, is cut off, as shown in Figure 15. Under these conditions, pressure is relieved by reason of the draining action of any leakage fluid, if there should be any, through the pipe line 239 and 240 to the drain 241. With reference to the clamping structure shown in Figures 18, 19 and 20, the clamping action of the lever 276 is released when said lever 276 engages the left side of plunger 280. Shortly after the turret slide 32 has retreated sufficiently far to cause the unclamping of the turret 51, the roller 97 (Figs. 14 and 14A) will engage the trip 91, causing the withdrawal of the locking bolt 86 from locking engagement with the turret 51. During the period while the trip 91 holds the locking bolt 86 in retracted position, the indexing operation is started. It may be stated at this point that immediately after the indexing operation has started, the roller 97 passes off to the right of the trip 91 as the parts are viewed in Figures 14 and 14A, allowing the spring 88 to urge the locking bolt 86 against the under side of the turret 51, ready to snap into the next adjacent recess 82. Indexing is accomplished by reason of the engagement of one of the pins 98 with the pawl 99. As the turret slide 32 continues to the right in its retreating movement as the parts are viewed in Figure 14, the lower extremity of one of said pins 98 will engage the extremity of the pawl 99, which pawl is mounted for swinging movement about a vertical axis, being journaled within a boss on the index plate 84. As the turret slide continues its indexing movement, a movement of rotation, i. e. an indexing movement, will be communicated to the turret 51. The locking bolt 86 is now enabled to snap into the next adjacent recess 82 for stopping the turret at the next succeeding station. The parts should be so adjusted, that is—the left-hand bracket 212 (Fig. 15) should be so positioned, as to reverse the movement of the turret slide 32 at this time. This reversing action is accomplished by reason of engagement of the left-hand bracket 212 with the plunger 48c of the valve 48, causing communication between the pipe line 218, pipe line 220 and pipe line 222 to the cylinder 210, moving the plunger of the cylinder 209 to position 209a (see Fig. 5). This change in the position of the plunger of valve 209 will deliver fluid under pressure from the pump 37 through pipe line 216 to the operating cylinder 43 to cause the forward movement of the turret slide 32 and turret 51.

It may be stated at this time that if the left-hand bracket 212 should not be properly adjusted, no harm can result. First let it be assumed that said left hand bracket 212 is positioned too far to the right as the parts are viewed in Figure 15, so that the forward movement of the turret slide 32 would be started before the turret has been completely indexed. Under these conditions the locking bolt 86 would not be in registry with any recess 82, and consequently the lever 89 would be held at the limit of its range of travel in a counter-clockwise direction, that is—in the position disclosed in Figure 14A. Under these conditions the lever 112 is at the limit of its range of movement in a clockwise direction, wherein the spring 108 holds the plunger 107 in its lowermost position. Under these conditions, said plunger 107 is in abutting relationship with the abutment 105, and even though fluid under pressure is communicated to the operating cylinder 43 in a direction to move the turret slide 32 in a forward direction, such movement is prevented by reason of the engagement referred to between plunger 107 and abutment 105. The attention of the operative is therefore drawn to the fact that the parts are not in proper adjustment and it will be necessary for him to properly adjust the left-hand bracket 212 to permit the indexing of the turret 51 before the turret slide 32 and turret 51 can advance in the forward direction.

Next let it be assumed that the left-hand bracket 212 is out of adjustment and does not engage the plunger of valve 48 to cause forward movement of the turret slide at the instant that indexing has been completed. Under these conditions pressure will be exerted upon the piston in the operating cylinder 43 to urge the turret slide 32 further in a retreating direction. Such further movement will be prevented, however, by reason of the engagement of one of the pins 98 with the pawl 99. As pressure builds up in the pump and pipe line 215, said pressure will be relieved through a certain safety mechanism, which is not illustrated and which forms no part of the present invention, such safety mechanism being old and well known in the art.

Though according to the description appearing in the preceding paragraph the pawl 99 takes the stress in case the left hand bracket 212 is so adjusted that operation of the plunger 48c of valve 48 is delayed beyond the completion of the indexing movement, in certain practical embodiments of the present invention the parts have been so proportioned that the piston within the operating cylinder 43 (or operating cylinder 286) comes in contact with the corresponding cylinder head at substantially the moment when indexing has been completed. Therefore, the stress of fluid under pressure applied to the cylinder 43 (or cylinder 286) is taken conjointly by the pawl 99 and the cylinder head of the operating cylinder referred to. Moreover, due to the fact that the upper extremity of the locking bolt 86 is tapered, said extremity acts as piloting means whereby the locking bolt 85 may find its way into each recess 82 in succession whether or not the left-hand bracket 212 is adjusted to cause reversal of the turret slide at the exact moment when indexing is completed. It is also possible to so adjust the relation of the maximum travel of the piston within the cylinder 43 or cylinder 286 that said piston will come to the end of its stroke just a minute distance before the indexing is fully completed. Due to the fact that the upper end of the locking pin 86 and its corresponding recess are tapered, the power of the spring 88 within the locking bolt 86 will complete the index by piloting action. Thus the pin 98 will be moved slightly away from the end of the pawl 99. If the left-hand bracket 212 has not yet reversed the position of the plunger within the valve 48 so that the travel of the turret slide is not reversed, the stress of the fluid being pumped into the cylinder 43 is taken by the piston and the end of the cylinder, and not by the pin 98 and the pawl 99.

Reciprocating movement of the turret slide will be continued until stopped by means of a stop block 182, one of which is shown in Figure 10 and in Figure 1. It will be understood, of course, that on each retreating movement the unclamping of the turret, the withdrawal of the locking bolt 86, the indexing of the turret, the snapping into place of the locking bolt 86 and the clamping of the turret will occur before the forward movement of the turret has proceeded to any considerable extent. The drum 137 (Fig. 10) will be provided with one or more stop blocks 182, depending upon whether all of the stations of the turret are to be gone through on the particular piece of work being handled, or whether the number of stations necessary for the particular piece being handled requires only a simple fraction of the total number of stations. For example, if three stations are required for any particular job, a stop block would be provided for stopping operations after the turret has completed three round trips. Another stop block, diametrically opposite to the first stop block, would be provided for stopping operations after the next three round trips. If the particular job being handled requires only two stations of the turret, three stop blocks would be provided. If the particular job being handled requires only one station, a stop block might be provided for each tenon 140 of the drum 137. It may be stated parenthetically, however, that in the event that the particular job being handled requires only one station, a preferred practice would probably be to so set the left-hand bracket 212 (Fig. 15) that reversal from retreating movement to forward movement would be accomplished before the turret slide has retreated a sufficient distance to unclamp the turret and to cause the indexing of said turret.

From the foregoing description it will be clear that when the turret slide 32 is in retreating movement, the roller 153 will be held in a position to the right of that shown in Figure 10. Expressed in other language, and referring to Figure 5, the plunger in valve 210 will be in position 209d or 209e, which means that, referring to Figure 10, the lever 180 will hold the shaft 179 in a position such that the sliding member 157 and the roller 158 are disposed to the right of the positions shown in Figure 10. If the operative desires to set the mechanism so that stopping will occur at the completion of any predetermined retreating movement of the index plate, he will mount a stop block 182 upon the corresponding tenon 140. Said stop block will be disposed in position to provide an abutment to prevent movement of the roller 153 to the left as the parts are viewed in Figure 10 beyond the neutral position, which is the position assumed by the parts in Figure 10. Under these conditions, therefore, the sliding member 157, by reason of its engagement with the lever 178, will hold the shaft 179 in neutral position. Said shaft, being connected through lever 180 to the rod 181 which controls the plunger in valve 209, will, as described above, cause the by-passing of the fluid being pumped by pump 37 around the operating cylinder 43 (Figs. 1-15 inclusive) or the operating cylinder 286 (Figs. 21 and 22). The stop block referred to will therefore stop operations after any predetermined retreating trip of the turret slide 32.

As explained above, after movement of the turret slide has been stopped, the operative may start operations again by momentarily swinging the handle 164 in a clockwise direction as the parts are viewed in Figure 10. Said reinaugurated operation will continue, the turret slide 32 being reciprocated until the roller 153 engages the next stop block 182.

As indicated above, the present invention contemplates means whereby the operative may at his option assume control of the lathe at any time. The structure producing this advantage will now be described. Referring to Figures 1, 9, 9A and 15, it will be noted that the operative may grasp with one hand the upper extremities of the handles 183 and 184. By moving said extremities together, a pivotal action is had in handle 184 which has the effect of moving the collar 188 to the left as the parts are viewed in Figure 1. It will be noted from an inspection of Figure 15 that the collar 188 is fast to the bracket 190 which controls the valve rod 191 of the valve 192 when the operative grasps the two handles 183 and 184 to swing the handle 184 in a clockwise direction as the parts are viewed in Figure 1. He will thereby move the valve rod 191 to the left as the parts are viewed in Figures 9 and 9A. Under these conditions ports 202 and 203 are closed and ports 200 and 201 have communication with port 206. Under these conditions, therefore, the pipe lines 219 and 220 are closed and pipe lines 222 and 223 are open to the drain through the port 206 and port 208 which communicate with the pipe line 221 leading to the drain 217. Under these conditions it will be noted that there is a short-circuit for the fluid within the cylinder 210 and pipe lines 222 and 223, whereby the piston within cylinder 210 may be moved manually without opposition. The operative may therefore swing the shaft 179 about its axis by manipulation of handles 183 and 184, holding same in one hand. Inasmuch as the shaft 179 is connected through lever 180, link 180a and rod 181 to the plunger of the control valve 209 (Fig. 5), the operative may position the plunger of valve 209 to produce any resultant function of the turret slide which he desires. Expressed in other language, he may position the plunger of valve 209 for any of the functions referred to above and indicated in Figure 5, namely, rapid traverse forward movement, feeding movement in a forward direction, having the turret slide at rest (that is—with the plunger of valve 209 in neutral position), feeding movement in a retreating direction, or rapid traverse in a retreating direction. By reason of this construction the operative may practically instantaneously stop or reverse the turret slide if he sees fit. The operative may take this action at any point of the cycle of operation of the turret lathe.

Though certain preferred embodiments of the present invention have been described in detail, many modifications will occur to those skilled in the art. It is intended to cover all such modifications that fall within the scope of the appended claims.

What is claimed is—

1. In a turret lathe, in combination, a rotatable work holding member, a reciprocable turret slide cooperating therewith, a turret carried by said slide, said slide and said turret having mechanism for causing the indexing of said turret in response to reciprocations of said slide, fluid pressure responsive means including a pump for moving said slide, a cam drum positively connected to said turret, said drum having a plurality of cams disposed about its periphery for controlling said fluid pressure responsive means to cause same to move said turret slide, each of said cams being provided with a second cam adjustable relative thereto for the mechanical action of said pump to control the speed of movement of said slide.

2. In a turret lathe, in combination, a turret slide, fluid pressure responsive means including a pump for moving said slide, a turret carried by said slide, said slide and turret having mechanism cooperating therewith for causing the indexing of said turret in response to reciprocations of said slide, a cam drum positively connected to said turret whereby to rotate in unison with the indexing movements of said turret, said drum having a plurality of cams disposed about its periphery, said drum being connected to reciprocate axially in unison with said slide, said cams being adjustable longitudinally of said drum and being adapted to control said fluid pressure responsive means to change the speed of movement of said slide from rapid traverse to feeding movement, each of said cams having a second cam adjustable relative thereto for modifying the mechanical action of said pump.

3. In a lathe, in combination, a rotatable work holding means, a slidable tool holder, fluid pressure responsive means for moving said tool holder, said fluid pressure responsive means including a pump, and an adjustable control valve responsive to movement of said tool holder for controlling the delivery of fluid medium from said pump and abutment means for stopping movement of said tool holder in opposition to said fluid pressure responsive means, said abutment means including a portion for operating said valve, said abutment means being adjustable relative to said work holding means whereby to provide adjustment of the action of said valve.

4. In a lathe, in combination, a rotatable work holding member, a slidable tool holding member, fluid pressure means for operating said tool holding member, said fluid pressure means having means for relieving said pressure in case of predetermined opposition to movement of said tool holding member, and an adjustable valve for controlling said fluid pressure means, said valve being adapted to be operated in response to movement of said tool holding member to cause said fluid pressure means to reciprocate said tool holding member, said fluid pressure means including an abutment adapted to be adjusted to stop movement of said tool holding member at predetermined regions to control the amount of opening of passageways in said valve.

5. In a lathe, in combination, a rotatable work holding member, a tool holding slide, fluid pressure means for operating said slide, said fluid pressure means including a source of pressure, conduit connections between said source and said slide, reversing means responsive to movement of said slide, a valve for controlling said conduit connections, and fluid pressure operating means for said valve reversing means responsive to movement of said slide for controlling said operating means and manually operable means for disconnecting said valve operating means from the remainder of said fluid pressure means and for operating said valve independently of said operating means.

6. In a lathe, in combination, a rotatable work holding member, a tool holding slide, fluid pressure means for operating said slide, said fluid pressure means including a source of pressure, conduit connections between said source and said slide, reversing means responsive to movement of said slide, a valve for controlling said conduit connections, and fluid pressure operating means for said valve reversing means responsive to movement of said slide for controlling said operating means, said reversing means including a valve and abutment means adjustable relative to said slide for controlling the passageways through said valve whereby the time consumed in reversing may be adjusted.

7. In a lathe, in combination, a rotary work holding member, a reciprocatory slide, fluid pressure means for moving said slide, said fluid pressure means including a source of pressure, conduit connections between said source and said slide, a valve for controlling the delivery of medium under pressure from said source to said conduit connections, fluid pressure responsive operating means for said valve and reversing means responsive to movement of said slide for controlling the connections of said valve operating means with said conduit connections and means operating in response to movement of said slide for operating said valve independently of said fluid pressure responsive operating means, and manual means for disconnecting said fluid pressure responsive operating means from the remainder of said fluid pressure means and for operating said valve independently of said fluid pressure responsive operating means.

8. In a lathe, in combination, a rotary work holding member, a reciprocatory tool holding slide, fluid pressure means for operating said slide, said fluid pressure means including a source of fluid pressure, conduit connections between said source and said slide, a valve for controlling the delivery of fluid medium under pressure to said conduit connections, fluid pressure responsive operating means for said valve, and means responsive to movement of said slide for operating said valve, the force exerted by said fluid pressure responsive operating means being low relative to the force exerted by said means responsive to movement of said slide, and manual means for disconnecting said fluid pressure operating means from the remainder of said fluid pressure means and for operating said valve independently of said fluid pressure responsive operating means.

9. In a turret lathe, in combination, a rotary work holding member, a reciprocatory tool holding slide, fluid pressure means for operating said slide, said fluid pressure means including a source of fluid pressure, conduit connections between said source and said slide, a valve for controlling the output of said source to said conduit connections, a fluid pressure responsive operating means for said valve, a turret carried by said slide, means for indexing said turret in response to reciprocations of said slide, a plurality of cam members adapted to be brought into operative position in succession in response to indexing movements of said turret, other operating means for said valve responsive to said cam members, the force of which said fluid pressure responsive operating means is capable being relatively low compared to the force of which said other valve operating means is capable, and reversing mechanism responsive to movement of said slide for controlling said fluid pressure responsive valve operating means to cause reciprocations of said slide.

10. In a turret lathe, in combination, a rotary work holding member, a reciprocatory tool holding slide, fluid pressure means for operating said slide, said fluid pressure means including a source of fluid pressure, conduit connections between said source and said slide, a valve for controlling the output of said source to said conduit connections, a fluid pressure responsive operating means for said valve, a turret carried by said slide, means for indexing said turret in response to reciprocations of said slide, a plurality of cam members adapted to be brought into operative position in succession in response to indexing movements of said turret, other operating means for said valve responsive to said cam members, the force of which said fluid pressure responsive operating means is capable being relatively low compared to the force of which said other valve operating means is capable, and reversing mechanism responsive to movement of said slide for controlling said fluid pressure responsive valve operating means to cause reciprocations of said slide, and manual means for disabling said fluid pressure responsive valve operating means, and for operating said valve independently of said fluid pressure responsive valve operating means.

11. In a turret lathe, in combination, a rotary work holding member, a reciprocatory slide, a turret carried by said slide, means for indexing said turret in response to reciprocations of said slide, fluid pressure means for operating said slide, said fluid pressure means including a valve for controlling the pressure developed upon said slide by said fluid pressure means, a plurality of cam members adapted to be selectably brought into operative position in response to indexing movements of said turret, and operating means for said valve responsive to said cam members, said fluid pressure means including means for biasing said valve operating means to positions for causing said fluid pressure means to move said slide, and stop means adapted to arrest said valve operating means in a position to control said fluid pressure means to stop said slide at a predetermined point in the cycle of operation of said turret lathe.

12. In a turret lathe, in combination, a reciprocatory slide, a turret carried by said slide, means for indexing said turret in response to reciprocations of said slide, cam carrying means, a plurality of cams upon said cam carrying means adapted to be successively brought into predetermined operative position in response to indexing movements of said turret, fluid pressure means for operating said slide, a valve for controlling said fluid pressure means to cause reciprocations of said slide and to vary the rate of movement of said slide, operating means for said valve responsive to said cams, and stop means rigid with said cam carrying means adapted to arrest said valve operating means at a predetermined point in the cycle of operation of said slide.

13. In a turret lathe, in combination, a reciprocatory slide, a turret carried by said slide, means for indexing said turret in response to reciprocations of said slide, cam carrying means, a plurality of cams upon said carrying means adapted to be successively brought into predetermined operative position in response to indexing movements of said turret, fluid pressure means for operating said slide, a valve for controlling said fluid pressure means to cause reciprocations of said slide and to vary the rate of movement of said slide, operating means for said valve responsive to said cams, and stop means rigid with said cam carrying means adapted to arrest said valve operating means at a predetermined point in the cycle of operation of said slide, and manual means for discontinuing the arresting relationship between said stop means and said valve operating means.

14. In a turret lathe, in combination, a rotary work holding member, a reciprocatory slide, a turret carried by said slide, means for indexing said turret in response to reciprocations of said slide, a cam drum connected to said turret, cams carried by said cam drum adapted to be brought into predetermined operative position in response to indexing movements of said turret, said cam drum being axially movable with said slide, fluid pressure means for operating said slide, a valve for controlling said fluid pressure means, operating means for said valve responsive to said cams in the axial movement of said cam drum, said fluid pressure means being adapted to bias said valve operating means to positions for causing movement of said slide, and stop means rigid with said cam drum for arresting movement of said valve operating means in a neutral position at a predetermined point in the cycle of operation of said slide.

15. In combination, a cam drum, a plurality of cam blocks spaced around the periphery of said drum, said cam blocks being adjustable relative to the length of said drum, a cam plate carried by each of said cam blocks, and setscrew means for securing each cam block in adjusted position upon said cam drum, each of said plates being provided with a plurality of slots for permitting adjustment of each cam plate relative to its corresponding cam block, one of said slots providing access to said setscrew means whereby said cam block may be adjusted longitudinally of said cam drum without disturbing the relationship between said cam plate and its corresponding cam block.

16. In combination, in a turret lathe, a rotary work holding member, a reciprocatory slide, a turret carried by said slide, indexing mechanism for said turret responsive to reciprocations of said slide, a cam drum connected to said turret to be positioned circumferentially at predetermined points to correspond with the indexed positions of said turret, fluid pressure means for operating said slide, a valve for controlling said fluid pressure means, said valve being adapted to control said fluid pressure means to selectively cause rapid traverse movement of said slide, feeding movement of said slide or stoppage of said slide, operating means for said valve, said fluid pressure means being adapted to bias said valve to cause rapid traverse movement of said slide, cam blocks carried by said cam drum, said cam blocks being adjustable relative to the length of said cam drum, said cam blocks being adapted in succession to control said valve operating means to cause said valve to move to slide feeding position, and cam means cooperatively associated with each of said cam blocks for controlling said fluid pressure means to adjust the feeding speed of said slide.

17. In a lathe, in combination, a rotary work holding member, a longitudinally movable slide, cross slides, longitudinally extending members secured to said longitudinally movable slide, said longitudinally extending members being provided with cam slots and said cross slides being provided with pins riding within said slots, said longitudinally extending members having abutments adapted to be engaged by said turret slide in the retreating movement thereof to cause withdrawal of said cross slide.

18. In a lathe, in combination, a rotary work holding member, a longitudinally movable slide, cross slides, longitudinal members secured to said longitudinally movable slide, each of said cross slides being connected to one of said longitudinal members through a pin and cam slot connection whereby longitudinal movement of said longitudinally movable slide transmits transverse movement to said cross slides, said longitudinally extending members having abutments adapted to be engaged by said turret slide in the retreating movement thereof to cause withdrawal of said cross slide.

19. In a turret lathe, in combination, a rotary work holding member, a turret slide longitudinally movable relative to said work holding member, a cross slide, a longitudinal member adapted to be moved by said turret slide, said longitudinal member being connected to said cross slide through a pin and cam slot connection whereby longitudinal movement of said longitudinal member will communicate transverse movement to said cross slide, spring held abutment means adapted to provide a connection between said turret slide and said longitudinal member, and a shoe secured to said turret for rendering operative said abutment means at a predetermined station of said turret, said longitudinal member having an abutment adapted to be engaged by said turret slide in the retreating movement thereof to cause withdrawal of said cross slide.

20. In a turret lathe, in combination, a rotary work holding member, a turret slide, a turret carried by said slide, means for indexing said turret, a pair of cross slides, longitudinally movable members, connecting means between said longitudinally movable members and said cross slides for communicating transverse movement to said cross slides when said longitudinally movable members are moved longitudinally, an abutment adapted to cooperate with each longitudinally movable member, said abutments being carried by said slide, spring means for holding said abutments out of cooperative relationship with said longitudinally movable members, and a shoe adapted to cooperate with each of said abutments to move its corresponding abutment into cooperative relationship with its corresponding longitudinally movable member whereby longitudinal movement of said turret slide will be communicated to said longitudinally movable members at predetermined stations of said turret, said shoes and their corresponding abutments being disposed at different radial distances from the axis of rotation of said turret.

21. In a turret lathe, in combination, a rotary work holding member, a turret slide longitudinally movable relative to said work holding member, a rotatable turret carried by said turret slide, a cross slide, a longitudinal member adapted to be moved by said turret slide, said longitudinal member being connected to said cross slide through a pin and cam slot connection whereby longitudinal movement of said longitudinal member will communicate transverse movement to said cross slide, spring held abutment means adapted to provide a connection between said turret slide and said longitudinal member, and a shoe secured to said turret for rendering operative said abutment means at a predetermined station of said turret, said shoes and their corresponding abutments being disposed at different radial distances from the axis of rotation of said turret.

22. In a turret lathe, in combination, a turret adapted to be indexed to different predetermined positions, a turret slide for supporting said turret, longitudinally movable members carried by said slide, said longitudinally movable members being provided with front and rear abutments, a pin cooperating with each of said longitudinally movable members and adapted to engage the front abutment and its corresponding longitudinally movable member for moving said corresponding longitudinally movable member, each of said pins being biased out of operative relationship with its corresponding longitudinally movable member and shoes carried by said turret for moving said pins into cooperative relationship with their corresponding longitudinally movable members, said shoes being disposed at different radial distances from the axis of rotation of said turret, the pin cooperatively associated with each shoe being correspondingly spaced from the axis of rotation of said turret, said turret slide being adapted to cooperate with said rear abutments of said longitudinally movable members in the retreating movement of said turret slide.

23. In a turret lathe, in combination, a turret slide, a turret carried by said slide, means for indexing said turret, means for locking said turret in indexed position, said means including a bolt adapted to seat itself selectably within any one of a plurality of recesses in said turret, supporting means for said turret slide, an abutment carried by said supporting means, a spring-pressed plunger adapted to abut against said abutment, and connecting means between said bolt and said plunger for holding said plunger in position to abut said abutment when said bolt is out of locking relationship with said turret.

24. In a turret lathe, in combination, a base member, a turret slide, a turret carried by said turret slide, means for indexing said turret, means for locking said turret in indexed position, said locking means including a reciprocable bolt, control means for said bolt comprising a pivoted trip for withdrawing said bolt at a predetermined point in the retreating movement of said turret slide, an abutment carried by said base, a spring-pressed plunger adapted to abut against said abutment, and means cooperatively associated with the control means for said bolt and said plunger for holding said plunger out of abutting relationship with said abutment when said bolt is in locking position.

25. In a turret lathe, in combination, a base member, a turret slide, a turret carried by said turret slide, means for indexing said turret, means for locking said turret in indexed position, said locking means including a reciprocable bolt, control means for said bolt comprising a pivoted trip for withdrawing said bolt at a predetermined point in the retreating movement of said turret slide, an abutment carried by said base, a spring-pressed plunger adapted to abut against said abutment, and means cooperatively associated with the control means for said bolt and said plunger for holding said plunger out of abutting relationship with said abutment when said bolt is in locking position, said plunger and said abutment having cooperating beveled portions for causing said plunger to slide over said abutment in the retreating movement of said turret slide.

26. In a turret lathe, in combination, a base, a movable turret slide, a turret carried by said slide, means for indexing said turret to predetermined positions, means for locking said turret to said slide at each of its indexed positions, and means for clamping said turret to said slide at each of said indexed positions, said slide having abutment means movable therewith for causing the unlocking of said turret and the unclamping of said turret at a predetermined point in the retreating movement of said turret slide.

27. In a turret lathe, in combination, a base, a turret slide, a turret, means for indexing said turret in response to reciprocations of said slide, fluid pressure means for moving said slide, said fluid pressure means being provided with relief means operative when predetermined obstacles to turret slide movement are encountered, a spring-pressed abutment for stopping forward movement of said turret, and means for holding said abutment out of operative position except when said turret is in fully indexed position.

28. In combination, a turret slide, a turret mounted thereon, means for causing indexing movements of said turret in response to reciprocations of said turret slide, a cross slide, means adapted to connect said turret slide with said cross slide to cause movement of said cross slide simultaneously with movement of said turret slide, said connecting means including an abutment assembly carried by said turret slide, said abutment assembly being biased to a position to disconnect said turret slide from said cross slide, and a shoe movable with said turret for moving said abutment assembly into cooperative relationship with said turret slide and cross slide, said connecting means including an abutment adapted to be engaged by said turret slide in the retreating movement thereof to cause withdrawal of said cross slide.

29. In combination, a turret slide, a turret mounted thereon, means for causing indexing movements of said turret in response to reciprocations of said turret slide, a cross slide, means adapted to connect said turret slide with said cross slide to cause movement of said cross slide simultaneously with movement of said turret slide, said connecting means including an abutment assembly carried by said turret slide, and a longitudinally movable member having a cam connection with said cross slide, said abutment assembly being biased to a position to disconnect said turret slide from said cross slide, and a shoe movable with said turret for moving said abutment assembly into cooperative relationship with said turret slide and cross slide, said abutment assembly including a resiliently mounted abutment member adapted to take the thrust between said shoe and said longitudinally movable member.

30. In a turret lathe, in combination, a turret slide, a turret carried thereby, a shoe carried by said turret, an abutment assembly carried by said turret slide, a cross slide, connecting means between said cross slide and said turret slide, said connecting means including a thrust member adapted to be abutted by said abutment assembly, said abutment assembly being biased out of abutting relationship with said thrust member, said shoe being adapted to move said abutment assembly into position wherein said abutment assembly is adapted to exert a thrust upon said thrust member, said abutment assembly including a resiliently mounted abutment member adapted to take the thrust between said shoe and said thrust member.

31. In a turret lathe, in combination, a turret slide, a turret carried thereby, a shoe carried by said turret, an abutment assembly carried by said turret slide, a cross slide, connecting means between said cross slide and said turret slide, said connecting means including a thrust member adapted to be abutted by said abutment assembly, said abutment assembly being biased out of abutting relationship with said thrust member, said shoe being adapted to move said abutment assembly into position wherein said abutment assembly is adapted to exert a thrust upon said thrust member, said abutment assembly including an abutment member, and a spring reacting upon said abutment member in a direction at right angles to the line of thrust between said abutment assembly and said thrust member and positioned to take abnormal stresses between said shoe and said thrust member.

32. In a turret lathe, in combination, a turret slide, a turret mounted thereon, a shoe carried by said turret, a cross slide, cam means adapted to be operated by said turret slide for transmitting movement to said cross slide, operating means for said cam means including an elongated member extending parallel to the line of movement of said turret slide, said elongated member providing a pair of abutments at spaced regions along its length, and an abutment assembly carried by said cross slide and responsive to said shoe, said abutment assembly including an abutment member adapted to cooperate with one of said abutments of said elongated member, said turret slide being adapted to engage the other of said abutments.

33. In a turret lathe, in combination, a turret slide, a turret mounted thereon, a shoe carried by said turret, a cross slide, cam means adapted to be operated by said turret slide for transmitting movement to said cross slide, operating means for said cam means including an elongated member extending parallel to the line of movement of said turret slide, said elongated member providing a pair of abutments at spaced regions along its length, and an abutment assembly carried by said cross slide and responsive to said shoe, said abutment assembly including an abutment member adapted to cooperate with one of said abutments of said elongated member, said abutment assembly being out of cooperative relationship with said elongated member, said turret slide being adapted to engage the other of said abutments.

34. In a turret lathe, in combination, a turret slide, a turret mounted thereon, a shoe carried by said turret, a cross slide, cam means adapted to be operated by said turret slide for transmitting movement to said cross slide, operating means for said cam means including an elongated member extending parallel to the line of movement of said turret slide, said elongated member providing a pair of abutments at spaced regions along its length, and an abutment assembly carried by said cross slide and responsive to said shoe, said abutment assembly including an abutment member adapted to cooperate with one of said abutments of said elongated member, said abutment assembly being biased out of cooperative relationship with said elongated member, said turret slide being adapted to engage the other of said abutments, said abutment assembly including a spring reacting against said abutment member along a line at right angles to the action of thrust between said abutment assembly and said elongated member.

35. In a turret lathe, in combination, a turret slide, a turret carried thereby, fluid pressure means for moving said turret, said fluid pressure means including a pump and control means for said pump, other fluid pressure means of relatively low pressure value compared to said first mentioned fluid pressure means for operating said control means to cause reciprocations of said turret slide, and cam means adapted to be rendered selectively operable in response to indexing movements of said turret for governing said control means to control the speed of said turret slide, said cam means being adapted to exert a pressure upon said control means in excess of the pressure of said low pressure means.

36. In a turret lathe, in combination, a turret slide, a turret adapted to be indexed in response to reciprocations of said turret slide, fluid pressure means for operating said turret slide, said fluid pressure means including a pump and means for controlling the output of said pump, low pressure means for governing said control means to cause reciprocations of said turret slide, and a plurality of cam means adapted to be rendered selectively operable in response to indexing movements of said turret for governing said control means, said cam means being adapted to overpower said low pressure means.

37. In a turret lathe, in combination, a turret slide, a turret adapted to be indexed in response to reciprocations of said turret slide, fluid pressure means for operating said turret slide, said fluid pressure means including a pump and means for controlling the output of said pump, low pressure means for governing said control means to cause reciprocations of said turret slide, and a plurality of cam means adapted to be rendered selectably operable in response to indexing movements of said turret for governing said control means, said cam means being adapted to overpower said low pressure means, and a stop member adapted to be rendered operable in response to indexing movements of said turret for stopping said control means in a neutral position to stop movement of said turret slide.

38. In a turret lathe, in combination, a turret slide, a turret adapted to be indexed in response to reciprocations of said turret slide, a cam carrying drum connected to said turret to be revolved in response to indexing movements of said turret, fluid pressure means for operating said turret slide, said fluid pressure means including a pump and control means for controlling the output of said pump, means for governing said control means to cause reciprocations of said turret slide, cam means mounted upon said cam carrying means for governing said control means to selectably produce feeding movement of said turret slide as distinguished from a rapid traverse movement thereof, and stop means adapted to be rendered operable in response to indexing movements of said turret for stopping said control means in neutral position to cause the stopping of said slide.

39. In a turret lathe, in combination, a turret slide, a turret adapted to be indexed in response to reciprocations of said turret slide, a cam carrying drum connected to said turret to be revolved in response to indexing movements of said turret, fluid pressure means for operating said turret slide, said fluid pressure means including a pump and control means for controlling the output of said pump, means for governing said control means to cause reciprocations of said turret slide, cam means mounted upon said cam carrying means for governing said control means to selectably produce feeding movement of said turret slide as distinguished from a rapid traverse movement thereof, and stop means adapted to be rendered operable in response to indexing movements of said turret for stopping said control means in neutral position to cause the stopping of said slide, and other cam means carried by said drum for controlling said pump to govern the speed of feeding movement of said turret slide.

40. In combination, a slide, fluid pressure means for operating said slide, control means for said fluid pressure means for controlling the direction and speed of movement of said slide, governing means responsive to said fluid pressure means for governing said control means, means responsive to movement of said slide for operating said control means, and manual means for disabling said governing means and for positioning said control means independently of said governing means.

41. In combination, a slide, fluid pressure means for operating said slide, control means for said fluid pressure means for controlling the direction and speed of movement of said slide, governing means responsive to said fluid pressure means for governing said control means, means responsive to movement of said slide for operating said control means, and manual means for disabling said governing means and for positioning said control means independently of said governing means, said operating means for said control means being adapted to exert a greater force upon said control means than can said governing means.

42. In combination, a slide, fluid pressure means for operating said slide, a control valve for controlling said fluid pressure means to control the direction and speed of movement of said slide, a governing cylinder for said control valve adapted to govern said control valve in response to movement of said slide to cause reciprocations of said slide, cam means movable with said slide for operating said control means to modify the speed of movement of said slide, and manual means for relieving said governing cylinder from pressure and for moving said control valve independently of said governing cylinder.

43. In combination, a sliding member, fluid pressure means for moving said sliding member, a control valve for said fluid pressure means for determining the direction of movement of said slide and the speed thereof, a governing cylinder for said control valve, said governing cylinder being responsive to the pressure within said fluid pressure means, and manually operable means for short-circuiting said governing cylinder, said manually operable means being connected to said control means whereby said control means may be manually operated independently of said governing cylinder.

44. In combination, a sliding member, a turret carried by said sliding member, means for indexing said turret in response to the reciprocations of said sliding member, cam carrying means and cams carried thereby, said cam carrying means being connected to said turret whereby to successively position said cams in operable position in synchronism with indexing movements of said turret, fluid pressure means for moving said turret, control means for said fluid pressure means, said cams being adapted to operate said control means to control the speed of movement of said slide, governing means responsive to movement of said slide for operating said control means to cause automatic reciprocation of said slide, and manual means for relieving said governing means of pressure and for moving said control means independently of said governing means.

45. In combination, a turret slide, a turret carried thereby, means for indexing said turret, a plurality of cams connected to said turret to move successively into operable position in response to indexing movements of said turret, fluid pressure means for moving said turret slide, control means for said fluid pressure means, said control means being responsive to said cams, relatively low pressure governing means for said control means, and manual means for relieving said governing means of pressure, said manual means being connected to said control means whereby said control means may be operated manually.

46. In combination, a turret slide, a turret thereon, cam carrying means connected to said turret to move in synchronism with indexing movements of said turret, cams mounted upon said cam carrying means, fluid pressure means for operating said turret slide, control means for said fluid pressure means to control the direction and speed of movement of said turret slide, governing means responsive to the pressure within said fluid pressure means for biasing said control means to cause rapid traverse movement of said turret slide, means adapted to be operated by said cams for controlling said control means in opposition to said governing means to cut down said rapid traverse movement to a feeding movement of said slide, and a stop member movable synchronously with the indexing movements of said turret for arresting said control means in neutral position to stop movement of said turret slide.

47. In combination, a turret slide, a turret thereon, cam carrying means connected to said turret to move in synchronism with indexing movements of said turret, cams mounted upon said cam carrying means, fluid pressure means for operating said turret slide, control means for said fluid pressure means to control the direction and speed of movement of said turret slide, governing means responsive to the pressure within said fluid pressure means for biasing said control means to cause rapid traverse movement of said turret slide, and means adapted to be operated by said cams for controlling said control means in opposition to said governing means to cut down said rapid traverse movement to a feeding movement of said slide, said means for controlling said control means being provided with a handle, and another handle adapted to be grasped simultaneously with said first mentioned handle for rendering said governing means inoperative whereby said control means may be operated independently of said governing means.

48. In combination, a turret slide, a turret thereon, cam carrying means connected to said turret to move in synchronism with indexing movements of said turret, cams mounted upon said cam carrying means, fluid pressure means for operating said turret slide, control means for said fluid pressure means to control the direction and speed of movement of said turret slide, governing means responsive to the pressure within said fluid pressure means for biasing said control means to cause rapid traverse movement of said turret slide, means adapted to be operated by said cams for controlling said control means in opposition to said governing means to cut down said rapid traverse movement to a feeding movement of said slide, and a stop member movable synchronously with the indexing movements of said turret for arresting said control means in neutral position to stop movement of said turret slide, said means for controlling said control means being provided with a handle, and another handle adapted to be grasped simultaneously with said first mentioned handle for rendering said governing means inoperative whereby said control means may be operated independently of said governing means.

49. In a turret lathe, in combination, a turret slide, a turret carried by said slide, fluid pressure means for moving said slide, a control valve for said fluid pressure means, a governing cylinder for said control valve, said cylinder being responsive to movement of said slide and adapted to govern said control valve to cause rapid traverse movement of said slide in opposite directions successively, means responsive to said slide for operating said control valve to control the speed of movement of said slide, and stop means operating in response to indexing movements of said turret for arresting said control valve in neutral position to stop said slide.

50. In a turret lathe, in combination, a turret slide, a turret carried thereby, fluid pressure means for moving said slide, a control valve for said fluid pressure means, a governing cylinder responsive to said fluid pressure means for biasing said control valve to positions to cause rapid traverse movement of said slide in opposite directions successively, cam means controlled by said slide for moving said control valve to intermediate positions to control the speed of said slide, a handle for operating said control valve, and a second handle closely adjacent to said first mentioned handle whereby said two handles may be grasped simultaneously within a man's hand, and means controlled by said second handle for relieving said governing cylinder of pressure.

51. In a turret lathe, in combination, a turret slide, a turret carried thereby, means for indexing said turret, fluid pressure means for moving said turret, means for clamping said turret responsive to said fluid pressure means, means for locking said turret and means responsive to said locking means for preventing forward movement of said turret until said locking means is in locking position.

52. In a turret lathe, in combination, a turret slide, a turret carried thereby, a locking bolt carried by said slide and adapted to seat itself within said turret, and stop means for preventing forward movement of said turret slide, said stop means being responsive to said locking bolt.

53. In a turret lathe, in combination, a turret slide, a turret carried thereby, a locking bolt carried by said slide adapted to seat itself successively into a plurality of corresponding apertures in said turret, said locking bolt being spring-pressed into locking relationship with said turret whereby to snap into said recesses successively as said turret is indexed, and trip means located in position to operate said locking means intermediate of the retreating movement of said slide to withdraw said locking means from locking position and stop means for preventing forward movement of said turret slide, said stop means being responsive to said locking bolt.

54. In a turret lathe, in combination, a turret slide, a turret carried thereby, a locking bolt carried by said slide adapted to seat itself successively into a plurality of corresponding apertures in said turret, said locking bolt being spring-pressed into locking relationship with said turret whereby to snap into said recesses successively as said turret is indexed, trip means located in position to operate said locking means intermediate of the retreating movement of said slide to withdraw said locking means from locking position, and stop means responsive to said locking means for stopping said slide against forward movement except when said locking means is in locking position.

55. In a turret lathe, in combination, a turret slide, a turret carried thereby, means for indexing said turret during the retreating movement of said turret slide, clamping means for said turret, and mechanism responsive to forward movement of said turret slide for rendering said clamping means effective and responsive to the retreating movement of said slide for rendering said clamping means ineffective, said mechanism including a cam lever cooperating with said clamping means, and an abutment resiliently urged into the path of movement of said cam lever.

56. In a turret lathe, in combination, a turret slide, a turret carried thereby, means for indexing said turret, means for clamping said turret to said turret slide, mechanism responsive to forward movement of said turret slide for rendering said clamping means effective and responsive to the retreating movement of said slide for rendering said clamping means ineffective, said mechanism including a cam lever cooperating with said clamping means, and an abutment resiliently urged into the path of movement of said cam lever and locking means for said turret, said locking means comprising a bolt having a piloting extremity whereby to accurately position said turret at the end of each indexing movement of said turret.

57. In a turret lathe, in combination, a turret slide, a turret carried thereby, means for indexing said turret adjacent to the full retreated position of said turret, said turret being provided on its under side with tapered recesses, a bolt carried by said slide, said bolt having a tapered extremity adapted to seat itself successively into said tapered recesses, trip means operative only during an intermediate portion of the retreating movement of said slide for withdrawing said bolt, spring-controlled stop means for preventing forward movement of said turret slide, and connecting mechanism between said bolt and said stop means for holding said stop means in inoperative position when said bolt is in locking position.

58. In combination, in a turret lathe, a relatively fixed member, a turret slide, a turret carried by said turret slide, said turret being provided with a plurality of recesses, said turret slide being provided with a bolt having a tapered extremity adapted to seat itself successively within said recesses for locking purposes, spring means for urging said bolt into locking relationship with said turret, a trip carried by said relatively fixed member operable only during a portion of the retreating movement of said turret slide for withdrawing said bolt from locking relationship with said turret, and means for indexing said turret operable while said bolt is withdrawn from said locking relationship.

59. In combination, in a turret lathe, a relatively fixed member, a turret slide, a turret carried by said turret slide, said turret slide being provided with a plurality of recesses, said turret slide being provided with a bolt having a tapered extremity adapted to seat itself successively within said recesses for locking purposes, spring means for urging said bolt into locking relationship with said turret, a trip carried by said relatively fixed member operable only during a portion of the retreating movement of said turret slide for withdrawing said bolt from locking relationship with said turret, and means for indexing said turret operable while said bolt is withdrawn from said locking relationship, cooperating abutment members carried by said relatively fixed member and said slide, one of said abutment members being spring pressed and adapted to ride over the other of said abutment members in the retreating movement of said slide but adapted to abut substantially flatwise against said other abutment member on the forward movement of said slide to stop said slide, and means responsive to said bolt for controlling the position of said spring pressed abutment member.

60. In a turret lathe, in combination, a bed, a turret slide movable along said bed, a turret carried by said slide, means for indexing said turret, means for clamping said turret to said slide, mechanism responsive to forward movement of said turret slide for rendering said clamping means effective and responsive to the retreating movement of said slide for rendering said clamping means ineffective, said mechanism including a cam lever cooperating with said clamping means and an abutment resiliently urged into the path of movement of said cam lever.

61. In a turret lathe, in combination, a bed, a turret slide movable along said bed, a turret carried by said slide, means for indexing said turret, and means for clamping said turret to said slide, said clamping means being responsive to movement of said slide along said bed, said clamping means including a clamping member adapted to press said turret against said slide, cam lever means for controlling said clamping member, an abutment carried by said bed adapted to operate said cam means, and spring means for urging said abutment into the path of movement of said lever means.

62. In combination, the bed of a lathe, a turret slide movable upon said bed, a turret carried by said slide, clamping means for pressing said turret against said slide, said clamping means including a swinging cam member adapted to render said clamping means operative, an abutment carried by said bed, said abutment being positioned to engage said swinging cam member during the retreating movement of said slide to swing said cam member to releasing position and to engage said swinging cam member during the forward movement of said slide to swing said cam member to clamping position and spring means for urging said abutment into the path of movement of said swinging cam member.

63. In a turret lathe, in combination, a bed, a turret slide, a turret carried by said slide, means movable with said slide for clamping said turret to said slide, said means including a lever having a cam surface adapted to apply clamping pressure to said turret and slide, a movable abutment having its axis of movement fixed relative to said bed, and spring means for urging said abutment into position wherein it is adapted to be engaged by said lever during the forward and retreating movements of said slide, said lever being adapted to ride over the top of said abutment in the forward and retreating movements of said slide, the cam surface of said lever being so disposed relative to the remainder of said lever that a high portion of said cam surface is brought into operative clamping position when said lever is carried forwardly over said abutment.

64. In a turret lathe, in combination, a bed, a turret slide, a turret, a stud extending upwardly from said slide, a clamping member adapted to exert clamping pressure against said turret, a sleeve encircling said stud, said sleeve and stud being adapted by relative movement to urge said clamping member into clamping relationship with said turret, a camming lever carried by said stud, said camming lever having a cam surface adapted to react against said sleeve, and an abutment member carried by said bed and movable in a direction transversely to the line of movement of said slide for operating said camming lever.

65. In a turret lathe, in combination, a bed, a turret slide, a turret, a stud extending upwardly from said slide, a clamping member adapted to exert clamping pressure against said turret, a sleeve encircling said stud, said sleeve and stud being adapted by relative movement to urge said clamping member into clamping relationship with said turret, a camming lever carried by said stud, said camming lever having a cam surface adapted to react against said sleeve, and an abutment member carried by said bed and movable in a direction transversely to the line of movement of said slide for operating said camming lever, said abutment member being provided with a spring for urging same into position to engage said lever in the forward and retreating movements of said slide.

66. Means for clamping a turret to a turret slide comprising a camming lever adapted to exert clamping force between said slide and said turret, said lever having a camming surface, and a spring-pressed abutment adapted to engage said lever to move said camming surface into and out of camming position.

67. Means for clamping a turret to a turret slide comprising a camming lever adapted to exert clamping force between said slide and said turret, said lever having a camming surface, and a spring-pressed abutment adapted to engage said lever to move said camming surface into and out of camming position, said lever being adapted to ride over said abutment, said abutment having a predetermined limit to its range of movement whereby said abutment will positively move said camming surface into camming position during the forward movement of said turret slide.

68. In a turret lathe, in combination, a turret slide, a turret, fluid pressure means for operating said slide, said fluid pressure means including a pump, cam means adapted to be rendered selectably operable in response to indexing movements of said turret, a cam follower adapted to cooperate successively with said cam means, mounting means for said cam follower, and connections between said mounting means and said pump for controlling the mechanical action of said pump to control the speed of travel of said slide.

69. In a turret lathe, in combination, a turret slide, a turret carried thereby, said turret being adapted to be indexed in response to reciprocations of said slide, fluid pressure means for moving said slide, said fluid pressure means having a control valve for controlling the effect of said fluid pressure means, a governing cylinder for said control valve for biasing said valve to cause rapid traverse movement of said slide in opposite directions successively, a plurality of cam members adapted to be brought selectably into operative position in response to indexing movement of said turret, and a cam follower adapted to cooperate successively with said cam members, said cam follower being connected to said control valve for operating said valve to cut down the speed of movement of said slide from a rapid traverse movement to a feeding movement.

70. In a turret lathe, in combination, a turret slide, a turret carried thereby, said turret being adapted to be indexed in response to reciprocations of said slide, fluid pressure means for moving said slide, said fluid pressure means having a control valve for controlling the effect of said fluid pressure means, a governing cylinder for said control valve for biasing said valve to cause rapid traverse movement of said slide in opposite directions successively, a plurality of cam members adapted to be brought selectably into operative position in response to indexing movement of said turret, a cam follower adapted to cooperate successively with said cam members, said cam follower being connected to said control valve for operating said valve to cut down the speed of movement of said slide from a rapid traverse movement to a feeding movement, and stop means operable in response to indexing movements of said turret for arresting movement of said cam follower to hold said control valve in neutral position to stop said slide.

71. In a turret lathe, in combination, a turret slide, a turret carried thereby, said turret being adapted to be indexed in response to reciprocations of said slide, fluid pressure means for moving said slide, said fluid pressure means having a control valve for controlling the effect of said fluid pressure means, a governing cylinder for said control valve for biasing said valve to cause rapid traverse movement of said slide in opposite directions successively, a plurality of cam members adapted to be brought selectably into operative position in response to indexing movement of said turret, a cam follower adapted to cooperate successively with said cam members, said cam follower being connected to said control valve for operating said valve to cut down the speed of movement of said slide from a rapid traverse movement to a feeding movement, stop means operable in response to indexing movements of said turret for arresting movement of said cam follower to hold said control valve in neutral position to stop said slide, and manual means for removing said cam follower from operative relationship with said stop means.

72. In a turret lathe, in combination, a turret slide, a turret carried thereby, said turret being adapted to be indexed in response to reciprocations of said slide, fluid pressure means for moving said slide, said fluid pressure means having a control valve for controlling the effect of said fluid pressure means, a governing cylinder for said control valve for biasing said valve to cause rapid traverse movement of said slide in opposite directions successively, a plurality of cam members adapted to be brought selectably into operative position in response to indexing movement of said turret, a cam follower adapted to cooperate successively with said cam members, said cam follower being connected to said control valve for operating said valve to cut down the speed of movement of said slide from a rapid traverse movement to a feeding movement, and additional cam members adapted to be rendered selectably operative in response to indexing movements of said turret for controlling said fluid pressure means to vary said feeding movement of said slide.

73. In a turret lathe, in combination, a turret slide, a turret carried thereby, said turret being adapted to be indexed in response to reciprocations of said slide, fluid pressure means for moving said slide, said fluid pressure means having a control valve for controlling the effect of said fluid pressure means, a governing cylinder for said control valve for biasing said valve to cause rapid traverse movement of said slide in opposite directions successively, a plurality of cam members adapted to be brought selectably into operative position in response to indexing movement of said turret, a cam follower adapted to cooperate successively with said cam members, said cam follower being connected to said control valve for operating said valve to cut down the speed of movement of said slide from a rapid traverse movement to a feeding movement, stop means operable in response to indexing movements of said turret for arresting movement of said cam follower to hold said control valve in neutral position to stop said slide, and additional cam members adapted to be rendered selectably operative in response to indexing movements of said turret for controlling said fluid pressure means to vary said feeding movement of said slide.

74. In a turret lathe, in combination, a turret slide, a turret carried thereby, said turret being adapted to be indexed in response to reciprocations of said slide, fluid pressure means for moving said slide, said fluid pressure means having a control valve for controlling the effect of said fluid pressure means, a governing cylinder for said control valve for biasing said valve to cause rapid traverse movement of said slide in opposite directions successively, a plurality of cam members adapted to be brought selectively into operative position in response to indexing movement of said turret, a cam follower adapted to cooperate successively with said cam members, said cam follower being connected to said control valve for operating said valve to cut down the speed of movement of said slide from a rapid traverse movement to a feeding movement, and stop means operable in response to indexing movements of said turret for arresting movement of said cam follower to hold said control valve in neutral position to stop said slide, manual means for removing said cam follower from operative relationship with said stop means, and additional cam members adapted to be rendered selectably operative in response to indexing movements of said turret for controlling said fluid pressure means to vary said feeding movement of said slide.

75. In a turret lathe, in combination, a turret slide, a turret carried thereby, means for indexing said turret in response to reciprocations of said turret slide, a cam drum, power transmitting means between said turret and said drum for causing said drum to move in unison with said turret, ratchet mechanism for positively locating said drum, said ratchet mechanism including a toothed member and a spring-pressed pawl, said toothed member and said pawl having cooperating piloting surfaces.

76. In a turret lathe, in combination, a turret slide, a turret, fluid pressure means for operating said slide, said fluid pressure means being provided with a control valve, cam means adapted to be rendered selectably operable in response to indexing movement of said turret, a cam follower adapted to co-operate successively with said cam members, mounting means for said cam follower, connections between said mounting means and said control valve for controlling the speed of travel of said slide, a governing means for said control valve for biasing same to cause rapid traverse movement of said turret slide in opposite directions successively, said governing means being operable by said fluid pressure means, and manual means for relieving said governing means of pressure and for operating said control valve.

77. In a machine comprising a tool support and a work support, one of said supports reciprocating transversely relative to othe other support for the performance of an operation on the work, the tool support having tools for performing more than one operation on the work, a variable delivery pump for supplying pressure fluid, a control valve for controlling the pump's delivery, means operative under fluid pressure for communicating movement to the reciprocating support according to the shifting of the control valve, means for indexing one of said supports to change the relationship between the work and the tools so that after one operation is completed another operation may be performed, cam means for controlling said control valve to cause predetermined movements of the reciprocating support in the one operation, and another cam means for operating said control valve after the indexing of said support to cause predetermined movement of the reciprocating support in the performance of the other operation.

78. In a machine of the class described, a reciprocable member, a cylinder and piston, one of which is connected with said member, a fluid pressure pump, said cylinder having a port at each end thereof, means including a slide valve for alternately connecting the pump with the cylinder ports, a controllable conduit connecting the pump with the slide valve casing at an end of the slide element, and means automatically actuated at a limit of piston travel to open said conduit whereupon fluid is admitted to the valve casing to move the slide element and thereby reverse the connections to the cylinder.

79. In a machine tool or the like the combination of a carrier, a hydraulic motor for advancing and retracting said carrier, a hydraulic circuit including a variable delivery pump for driving said motor, means for modifying the mechanical action of said pump to vary the delivery thereof, a series of cams movable with said carrier and selectively active to control said delivery varying means, and a support for said cams operable to shift any of said cams into active position.

WILLIAM H. FOSTER.

CERTIFICATE OF CORRECTION.

Patent No. 2,008,010.            July 16, 1935.

WILLIAM H. FOSTER.

It is hereby certified that error appears in the printed specification of the above numbered patent requiring correction as follows: Page 5, second column, line 45, for "89" read 99; page 21, first column, line 58, claim 33, after "being" insert the word biased; page 24, first column, line 56, claim 62, for "turrent" read turret; and page 25, second column, line 46, claim 74, for "selectively" read selectably; and that the said Letters Patent should be read with these corrections therein that the same may conform to the record of the case in the Patent Office.

Signed and sealed this 17th day of September, A. D. 1935, (Seal)                          Leslie Frazer
                              Acting Commissioner of Patents.